(12) United States Patent
Kumar et al.

(10) Patent No.: US 8,926,876 B2
(45) Date of Patent: Jan. 6, 2015

(54) METHOD FOR MAKING SHAPEABLE MICROCELLULAR POLY LACTIC ACID ARTICLES

(75) Inventors: Vipin Kumar, Seattle, WA (US); Krishna V. Nadella, Seattle, WA (US); Stephen Probert, Flagstaff, AZ (US)

(73) Assignee: University of Washington through its Center for Commercialization, Seattle, WA (US)

( * ) Notice: Subject to any disclaimer, the term of this patent is extended or adjusted under 35 U.S.C. 154(b) by 499 days.

(21) Appl. No.: 12/673,161

(22) PCT Filed: Aug. 15, 2008

(86) PCT No.: PCT/US2008/073360
§ 371 (c)(1),
(2), (4) Date: Aug. 4, 2010

(87) PCT Pub. No.: WO2009/023848
PCT Pub. Date: Feb. 19, 2009

(65) Prior Publication Data
US 2011/0003133 A1    Jan. 6, 2011

Related U.S. Application Data

(60) Provisional application No. 60/956,092, filed on Aug. 15, 2007.

(51) Int. Cl.
*B29C 44/34* (2006.01)
*C08J 9/12* (2006.01)

(52) U.S. Cl.
CPC .............. *C08J 9/122* (2013.01); *C08J 2367/04* (2013.01); *C08J 2201/032* (2013.01)
USPC ...... 264/50; 264/37.14; 264/37.15; 264/45.1; 264/46.1; 264/45.8; 264/46.2; 264/46.4; 264/46.5; 264/48; 264/51

(58) Field of Classification Search
USPC .......... 264/50, 37.14, 37.15, 45.1, 46.1, 45.8, 264/46.2, 46.4, 46.5, 48, 51, 628, 642, 643, 264/645, 663, 664, 674, 676, 677, 648, 510, 264/102, 241, 259, 294, 297.2, 297.5, 299, 264/319, 321
See application file for complete search history.

(56) References Cited

U.S. PATENT DOCUMENTS

| | | | |
|---|---|---|---|
| 4,473,665 | A | 9/1984 | Martini-Vvedensky |
| 5,223,545 | A | 6/1993 | Kumar |

(Continued)

FOREIGN PATENT DOCUMENTS

| | | |
|---|---|---|
| WO | 03/016015 A1 | 2/2003 |
| WO | 2004/020708 A1 | 3/2004 |

(Continued)

OTHER PUBLICATIONS

International Search Report, mailed Mar. 4, 2009, issued in corresponding International Application No. PCT/US2008/073360, filed Aug. 15, 2008.

*Primary Examiner* — Jeffrey Wollschlager
*Assistant Examiner* — Stella Yi
(74) *Attorney, Agent, or Firm* — Christensen O'Connor Johnson Kindness PLLC

(57) ABSTRACT

A method for making a shapeable article from poly(lactic acid) includes treating solid poly(lactic acid) that results in the solid poly(lactic acid) having a crystallinity of at least 20% by weight based on the weight of the solid poly(lactic acid) and a gas concentration of 6% to 16% by weight based on the weight of the solid poly(lactic acid); and heating the solid poly(lactic acid) having said minimum crystallinity and gas concentration to produce a cellular poly(lactic acid) article that is shapeable. The shapeable cellular poly(lactic acid) article is advantageous in that the article can be further shaped by heat and/or pressure (or vacuum), such as via thermoforming, into a variety of useful products.

16 Claims, 25 Drawing Sheets

(56) References Cited

U.S. PATENT DOCUMENTS 5,684,055 A 11/1997 Kumar
2006/0167122 A1* 7/2006 Haraguchi et al. .............. 521/60

FOREIGN PATENT DOCUMENTS

| WO | 2004/104072 A2 | 12/2004 |
| WO | 2005/097894 A1 | 10/2005 |

* cited by examiner

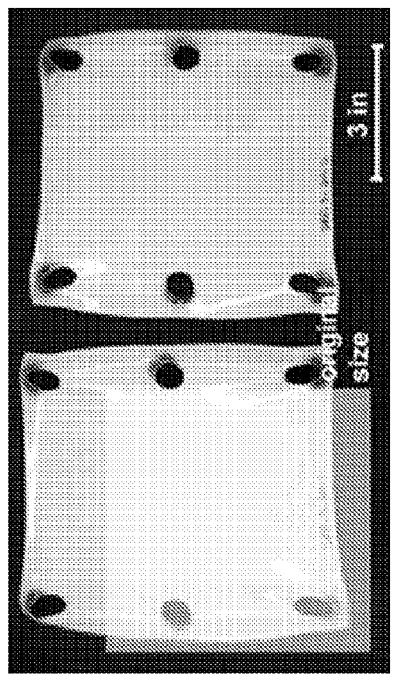
*Fig.29.*
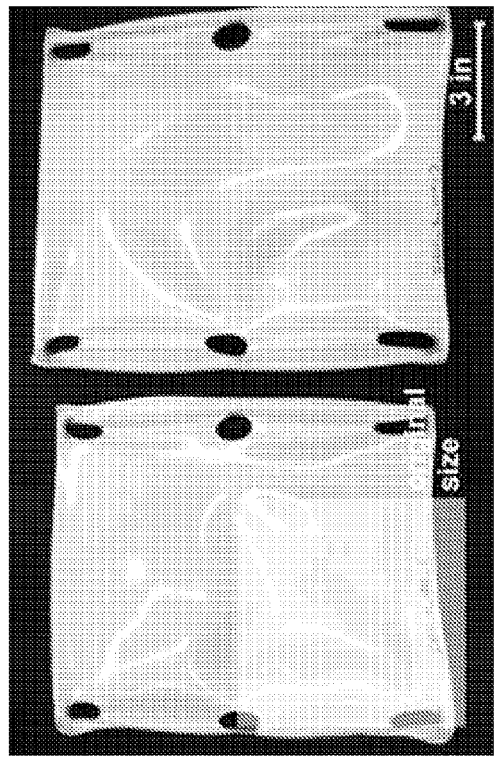
*Fig.30.*
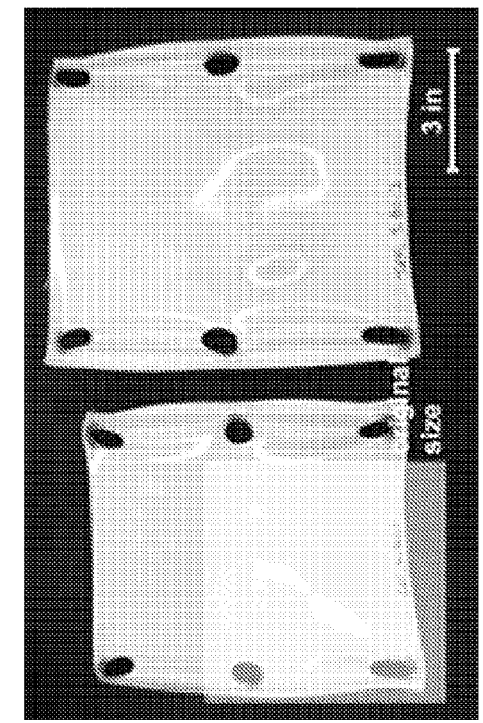
*Fig.31.*
*Fig.32.*

METHOD FOR MAKING SHAPEABLE MICROCELLULAR POLY LACTIC ACID ARTICLES

CROSS-REFERENCE TO RELATED APPLICATION

This application claims the benefit of U.S. Provisional Application No. 60/956,092, filed Aug. 15, 2007, the disclosure of which is incorporated herein expressly by reference.

BACKGROUND

A solid-state foaming process is illustrated in FIG. 1 wherein foaming occurs while the polymer remains in the solid state throughout the foaming process. This process differs from other standard polymer foaming processes because the polymer is not required to be in a molten state. Generally, at the beginning of the method, the polymer is in equilibrium with the surrounding temperature and pressure so that the polymer is "unsaturated." In block 102, the thermoplastic polymer is treated at an elevated pressure to cause the thermoplastic polymer to absorb gas. The treatment of the polymer in block 102 may be carried out in a pressure vessel, which is sealed, and then the material is exposed to a high pressure inert gas such as, but not limited to, carbon dioxide within the pressure vessel. The high pressure gas will then start to diffuse into the thermoplastic polymer over time, filling the polymer's free intermolecular volume. The gas will continue to saturate the polymer until equilibrium is reached. In block 104, the fully saturated polymer is removed from the saturation pressure to an environment of lower pressure so that the polymer is thermodynamically unstable, meaning that the polymer is supersaturated with gas and is no longer at equilibrium with the surrounding environment. The polymer will start to desorb gas from its surface into the surrounding environment. Desorption of some gas is desirable in some circumstances, for example, to avoid the creation of cellular structure in some areas of the polymer, such as at the surfaces. Desorption of the polymer can occur when the high-pressure gas is vented from the pressure vessel or the saturated thermoplastic polymer is removed into ambient atmospheric pressure. Heating of the partially saturated polymer in block 106 is carried out at a temperature below the melting temperature of the neat polymer. Heating produces a cellular thermoplastic polymer. Since the polymer is still in a solid state, the foams thus produced are called solid-state foams to distinguish them from foams that are produced in an extruder from a polymer melt. The cellular thermoplastic polymer is less dense than the noncellular polymer, thus saving material costs. However, depending on the polymer, the size of the cells, and relative density, the cellular polymer may or may not posses desirable characteristics.

In the last few years, "bio-based" solid poly(lactic acid) or "PLA" has been produced in large quantities for use in food and beverage packaging applications. This has led to a rise in the production of extruded solid PLA sheet or rod for thermoforming or molding food packaging and protective packaging that will biodegrade. Solid PLA articles use more materials and are heavier as compared to foams or cellular materials. Accordingly, it would be desirable to produce articles made from cellular PLA that can be subsequently thermoformed or molded similar to solid PLA.

SUMMARY

A first embodiment relates to a method for making a shapeable article from poly(lactic acid), includes treating solid poly(lactic acid) that results in the solid poly(lactic acid) having a crystallinity of at least 20% by weight based on the weight of the solid poly(lactic acid) and a gas concentration of 6% to 16% by weight based on the weight of the solid poly (lactic acid); and heating the solid poly(lactic acid) having said minimum crystallinity and gas concentration to produce a cellular poly(lactic acid) article that is shapeable.

A second embodiment relates to the method of the first embodiment, comprising treating the solid poly(lactic acid) with one or more gases at a pressure in the range of 3 MPa to 5 MPa.

A third embodiment relates to the method of the first embodiment, comprising treating the solid poly(lactic acid) with one or more gases at a pressure in the range of 2.75 MPa to 7 MPa.

A fourth embodiment relates to the method of the first, second, or third embodiment, wherein the one or more gases comprise carbon dioxide.

A fifth embodiment relates to the method of the first embodiment, further comprising treating the solid poly(lactic acid) with one or more gases at a pressure in the range of 3 MPa to 5 MPa to allow the one or more gases to be absorbed followed by treating the solid poly(lactic acid) at atmospheric pressure at a temperature in the range of −20° C. to 25° C. to allow the one or more gases to desorb from the solid poly (lactic acid).

A sixth embodiment relates to the method of the first through fifth embodiments, further comprising heating the solid poly(lactic acid) having said minimum crystallinity and said range of gas concentration at a temperature in the range of 40° C. to 100° C. to produce the cellular poly(lactic acid) that is shapeable.

A seventh embodiment relates to the method of the first embodiment, wherein treating comprises a period of gas saturation followed by a period of gas desorption to provide a minimum crystallinity of 20% by weight and the gas concentration of 6% to 16% by weight.

An eighth embodiment relates to the method of the seventh embodiment, wherein the solid poly(lactic acid) is completely saturated before the period of gas desorption.

A ninth embodiment relates to the method of the first embodiment, wherein treating comprises a period of partial gas saturation to provide a minimum crystallinity of 20% by weight and the gas concentration of 6% to 16% by weight.

A tenth embodiment relates to the method of the first through ninth embodiments, wherein the cellular poly(lactic acid) comprises cells having a size of 5 μm to 100 μm.

An eleventh embodiment relates to the method of the first through tenth embodiments, wherein the cellular poly(lactic acid) article has a density that is less than or equal to 40% of the density of the solid poly(lactic acid).

A twelfth embodiment relates to the method of the first through eleventh embodiments, wherein the cellular poly (lactic acid) article has a cellular poly(lactic acid) structure within the interior and an integral noncellular poly(lactic acid) layer at the surface.

A thirteenth embodiment relates to a method for making a shaped product from solid poly(lactic acid), including treating solid poly(lactic acid) that results in the solid poly(lactic acid) having a minimum crystallinity of 20% by weight based on the weight of the solid poly(lactic acid) and a gas concentration of 6% to 16% by weight based on the weight of the solid poly(lactic acid); heating the solid poly(lactic acid) having said minimum crystallinity and said range of gas concentration to produce a cellular poly(lactic acid) article that is shapeable; and shaping the cellular poly(lactic acid) into a product.

A fourteenth embodiment relates to the method of the thirteenth embodiment, wherein the cellular poly(lactic acid) article comprises a gas concentration of essentially 0% by weight before shaping.

A fifteenth embodiment relates to the method of the thirteenth and fourteenth embodiments, wherein shaping comprises applying heat and at least one of pressure or vacuum to the cellular poly(lactic acid).

A sixteenth embodiment relates to the method of the thirteenth through fifteenth embodiments, wherein shaping comprises molding the cellular poly(lactic acid) to the shape of a mold.

A seventeenth embodiment relates to the method of the thirteenth through fifteenth embodiments, wherein the solid poly(lactic acid) is a rod or sheet.

An eighteenth embodiment relates to a poly(lactic acid) having cells less than 100 microns (μm), a maximum density relative to the density of solid PLA of 40%, a percent tensile elongation before break of 10% to 50%, and a minimum crystallinity of 20%.

A nineteenth embodiment relates to the poly(lactic acid) of eighteenth embodiment having the form of a sheet or rod.

A twentieth embodiment relates to the poly(lactic acid) of the eighteenth and nineteenth embodiments, wherein the poly (lactic acid) has a cellular poly(lactic acid) structure within the interior and a noncellular poly(lactic acid) layer at the surface.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 29 is a photograph of samples saturated at 3 MPa and heated to 40 C in infrared;

FIG. 30 is a photograph of samples saturated at 3 MPa and heated to 60 C in infrared;

FIG. 31 is a photograph of samples saturated at 3 MPa and heated to 80 C in infrared;

FIG. 32 is a photograph of samples saturated at 3 MPa and heated to 100 C in infrared;

DETAILED DESCRIPTION

Poly(lactic acid) (herein referred to as "PLA") is a biodegradable, thermoplastic, high modulus polymer that can be obtained from annually renewable resources, such as corn starch or sugar cane. In addition to the wide applications in biomedical fields, recently developed and commercially available solid PLA has made it feasible for use as a packaging material. It may be used as a renewable degradable plastic for uses in service ware, mulch films, grocery waste, and composting bags, etc. In order to be made into such products, solid PLA is shaped by heat and pressure, for example, such as in thermoforming. To save on material, a cellular shapeable PLA article is disclosed herein that can be shaped by heat and pressure into useful articles similar to solid PLA. The cellular PLA articles disclosed herein that are shapeable include desirable properties, such as a smooth and glossy appearance, are ductile to allow for shaping, and are rigid once shaped. A method for making the cellular PLA articles that are shapeable are also disclosed, as well as a method for shaping the cellular PLA articles into articles.

PLA is a semicrystalline amorphous solid. In this application, crystallinity is given as a percent by weight based on the total weight of the PLA. Crystallinity percent by weight is measured using a differential scanning calorimetry (DSC) technique. A suitable instrument for measuring crystallinity percent includes the Nitzche DSC instrument with a computerized data acquisition system. The enthalpies of fusion and crystallinity of PLA were determined according to the standard ASTM D3417-97. Generally, the density of PLA is in the range of 1.21 g/cm$^3$ to 1.43 g/cm$^3$. A preferred density of a cellular PLA article disclosed herein would be about 40% (40% relative density) of the original density of the solid PLA or less.

Figure 1:
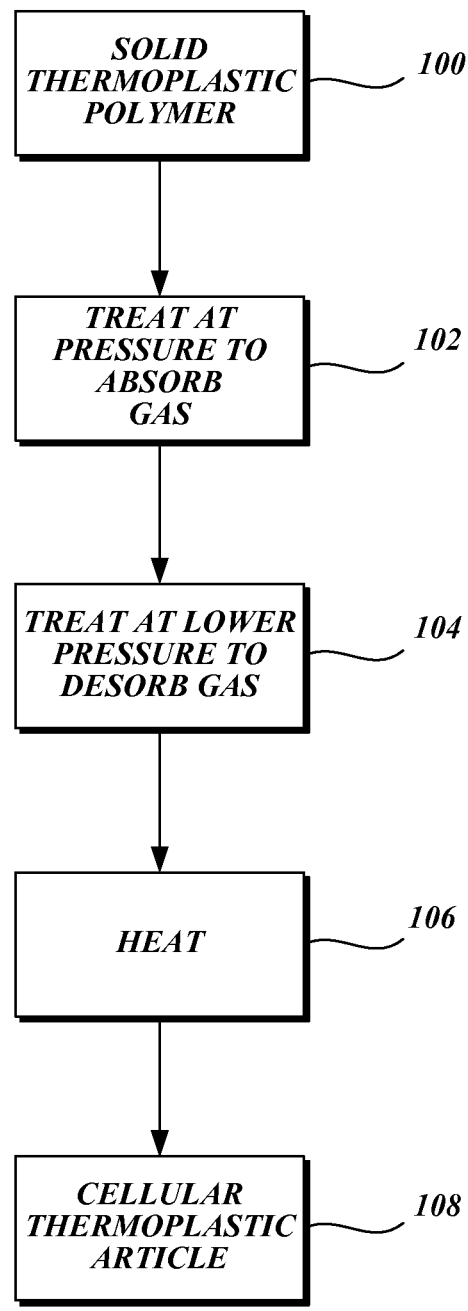
FIG. 1 is a flow diagram of a related art method for foaming solid thermoplastic materials.

The inventors' early attempts at foaming PLA via a solid state method often resulted in the foamed article being warped, corrugated, and/or wrinkled due to violent foaming because of the greater quantities of gas being released from PLA very rapidly. The foamed article was geometrically and mechanically unsuitable for thermoforming or molding applications and often had either large cell sizes or blisters. When PLA is subjected to the solid-state microcellular foaming process of FIG. 1, it was found that the rate at which PLA absorbs and desorbs carbon dioxide gas is significantly higher compared to thermoplastic materials like poly(ethylene terephthalate) and poly(acrylonitrile-butadiene-styrene). The high diffusion rate of PLA creates processing issues during desorption and foaming.

To successfully make cellular PLA articles that are shapeable, it was discovered that immediately before foaming via the application of heat, the solid PLA included a gas concentration in the range of 6% to 16% by weight based on the weight of PLA and included a minimum crystallinity of 20% by weight based on the weight of PLA. Foaming solid PLA with these characteristics results in a cellular PLA article having the properties that render the article suitable for shaping via heat and pressure (or vacuum). The cellular PLA article has a maximum relative density of 40% or less compared to the density of the noncellular PLA. The cellular PLA article has a minimum crystallinity of 20% by weight based on the weight of the PLA. The cellular PLA article has a smooth glossy outer integral PLA skin that is noncellular and a cellular PLA structure in the interior. The cellular PLA article has cells less than 100 microns, generally in the range of size of 5 to 100 μm. The cellular PLA article has a percent tensile elongation before break in the range of 10% to 50%, and the cellular PLA article remains rigid once shaped by heat and pressure (or vacuum).

Figure 2:
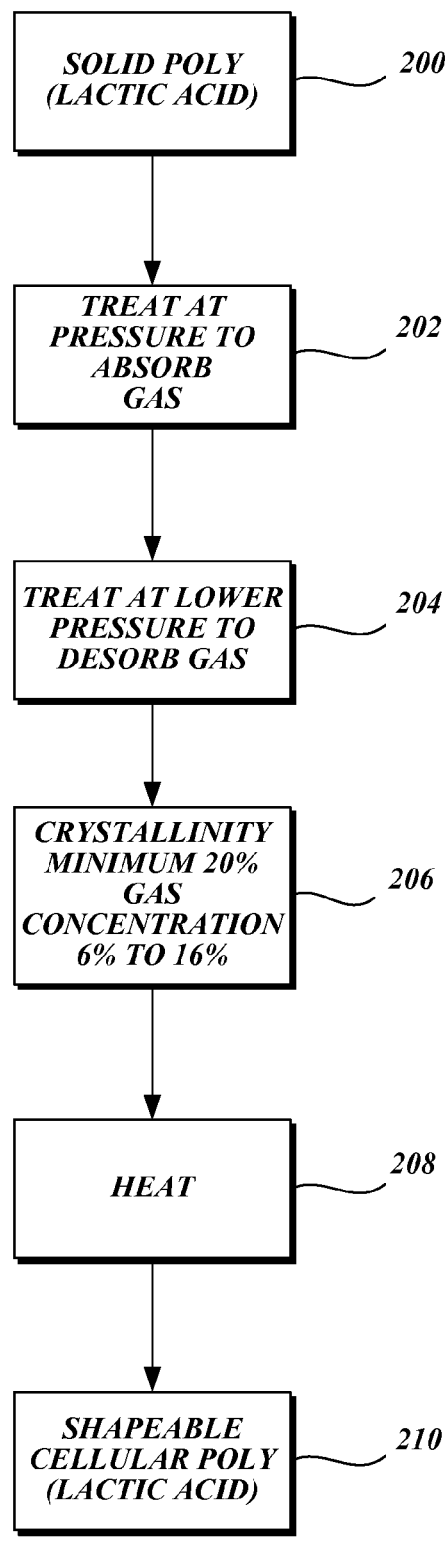
FIG. 2 is a flow diagram of a method for making a cellular poly(lactic acid) article that is shapeable.

Referring to FIG. 2, one embodiment of a method for producing a cellular poly(lactic acid) article that is shapeable is provided. Shapeable refers to the ability of the article to be transformed into a different form or shape through the application of heat and pressure (or vacuum), such as through thermoforming. The method illustrated in FIG. 2 includes block 200. In block 200, PLA is obtained. The PLA obtained can be provided as a rod or rolled sheet of PLA material. A representative supplier of PLA is Ex-Tech Plastics of Richmond, Ill., U.S.A., which can provide PLA as a sheet having a thickness of 0.60 mm. The resin from which the sheet was extruded is PLA 2002D (FG Grade) made by NatureWorks™ LLC of Minnetonka, Minn. This PLA material has a density of 1.24 g/cm$^3$ and a glass transition temperature of 55° C. The crystallinity percent of the as-received solid PLA material is below 5%, and the percent tensile elongation before break is 6%.

From block 200, the method enters block 202. In block 202, the solid PLA is treated under pressure with one or more gases. The PLA can be enclosed in a sealed pressure vessel, for example, from which air has been evacuated or purged and then any one or more suitable gas or gases is introduced into the pressure vessel. Representative of the one or more gases are carbon dioxide and/or nitrogen. A suitable pressure at which to treat the solid PLA in step 202 is from 2.75 MPa to 7 MPa. Preferably, the range is from 3 MPa to 5 MPa. In block 202, the solid PLA can be saturated completely followed by block 204. In block 204, the solid PLA treated in block 202 is treated at a lower pressure and/or at a lower temperature to allow the one or more gases to desorb to achieve partial saturation. Desorption can proceed at ambient atmospheric pressure and at a temperature of −20° C. to 25° C. Desorption proceeds until the concentration of the one or more gases in the PLA is 6% to 16% by weight based on the weight of the PLA. In an alternative embodiment, in block 202 the one or more gases only partially saturates into the solid PLA. The concentration of the one or more gases in the latter embodiment is also in the range of 6% to 16% by weight based on the weight of the PLA. Block 204, which provides for desorption of gas, allows for the creation of cellular PLA articles that have an integral noncellular outer skin. Integral refers to being formed from the same PLA material that also forms the cellular structure of the interior. Furthermore, it was found that in order to make many small cells that results in the desired density reduction, the crystallinity is preferred to be a minimum of 20% by weight based on the weight of the PLA, for the range of saturation pressures of 3 MPa to 5 MPa and gas concentration in the range of 6%-16%. A crystallinity minimum of 20% by weight produces a majority of cells in the range of 5 μm to 100 μm. The higher crystallinity also leads to a greater number of nucleation sites for cell growth. When PLA is heated having a crystallinity of a minimum 20% by weight and a gas concentration range of 6% to 16% by weight, the number and size of the cells that result provide the cellular PLA with a relative density compared to the virgin material of 40% or less. The cellular PLA also has the proper outer appearance, is generally flat, is ductile and rigid once shaped by heat and pressure (or vacuum) Process conditions of blocks 202 and/or 204 are adjusted so that the solid PLA achieves a crystallinity of at least 20% by weight based on the weight of the solid PLA and also achieves a gas concentration in the range of 6% to 16% by weight based on the weight of the solid PLA immediately before foaming, block 206. From block 206, the method enters block 208.

In block 208, the solid PLA having a crystallinity by weight of at least 20% and a gas concentration of 6% to 16% by weight is heated to create the cellular structure. In one particular embodiment, the temperature for foaming of block 208 is in the range of 40° C. to 100° C. Heating, particularly in the case for commercial application can be by a flotation/impingement air oven that can accept sheets and rods of PLA. The result of heating the solid PLA at the specified crystallinity and gas concentration ranges results in a shapeable cellular PLA article. Shapeable as used herein means the ability to be formed to a new shape by the application of heat, pressure (or vacuum), or both. The shapeable cellular PLA article has cell sizes less than 100 microns, a maximum density relative to the density of solid PLA of 40%, a percent tensile elongation before break of 10% to 50%, and a minimum crystallinity of 20%. The cell size is generally in the range of 5 μm to 100 μm. The shapeable cellular PLA article has a cellular PLA structure within the interior and an integral non-cellular PLA layer on the surface. The integral non-cellular layer on the exterior is produced by providing a step for gas desorption, block 204. The shapeable PLA article can have the form of a rod, sheet or roll.

Figure 3:
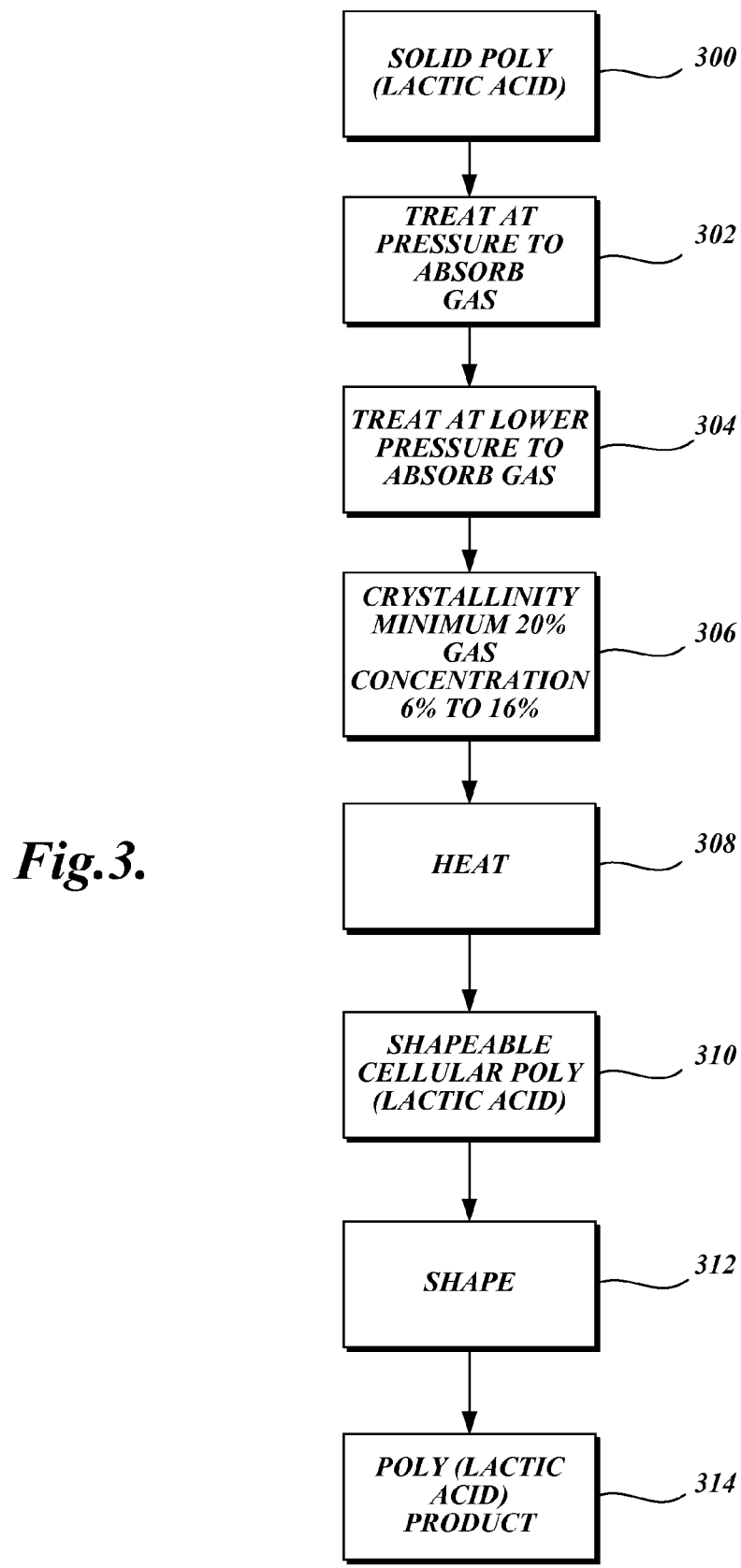
FIG. 3 is a flow diagram of a method for making a shaped cellular poly(lactic acid) article.

Referring to FIG. 3, another embodiment of a method in accordance with the present disclosure is illustrated. Blocks 300-310 are similar to blocks 200-210, respectively of the embodiment illustrated in FIG. 2. The method represented by FIG. 3 includes block 312. Block 312 is for shaping the shapeable cellular PLA article produced in block 310. Shaping can be done by any process that uses heat and/or pressure (or vacuum) to change the shape of the cellular PLA article, such as by thermoforming or molding. The shapeable cellular PLA article of block 310 is allowed to undergo desorption of gas so that the gas concentration is essentially 0% by weight before the shaping process, block 312. A shaped cellular PLA article is produced, block 314. The shaped cellular PLA article can be packaging, for example.

Figure 4:
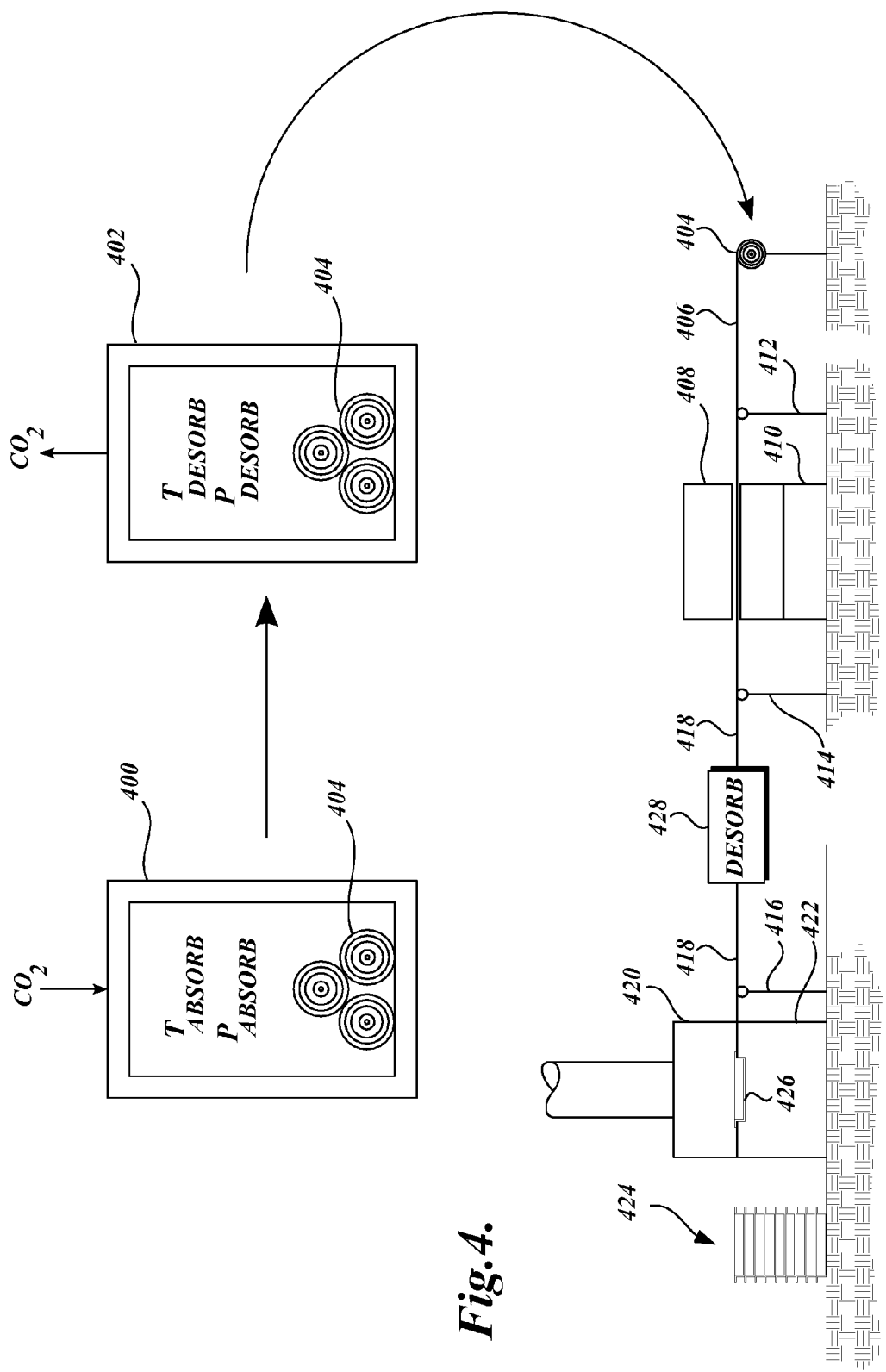
FIG. 4 is a diagrammatical illustration of equipment to produce a shaped cellular poly(lactic acid) article.
Figure 5:
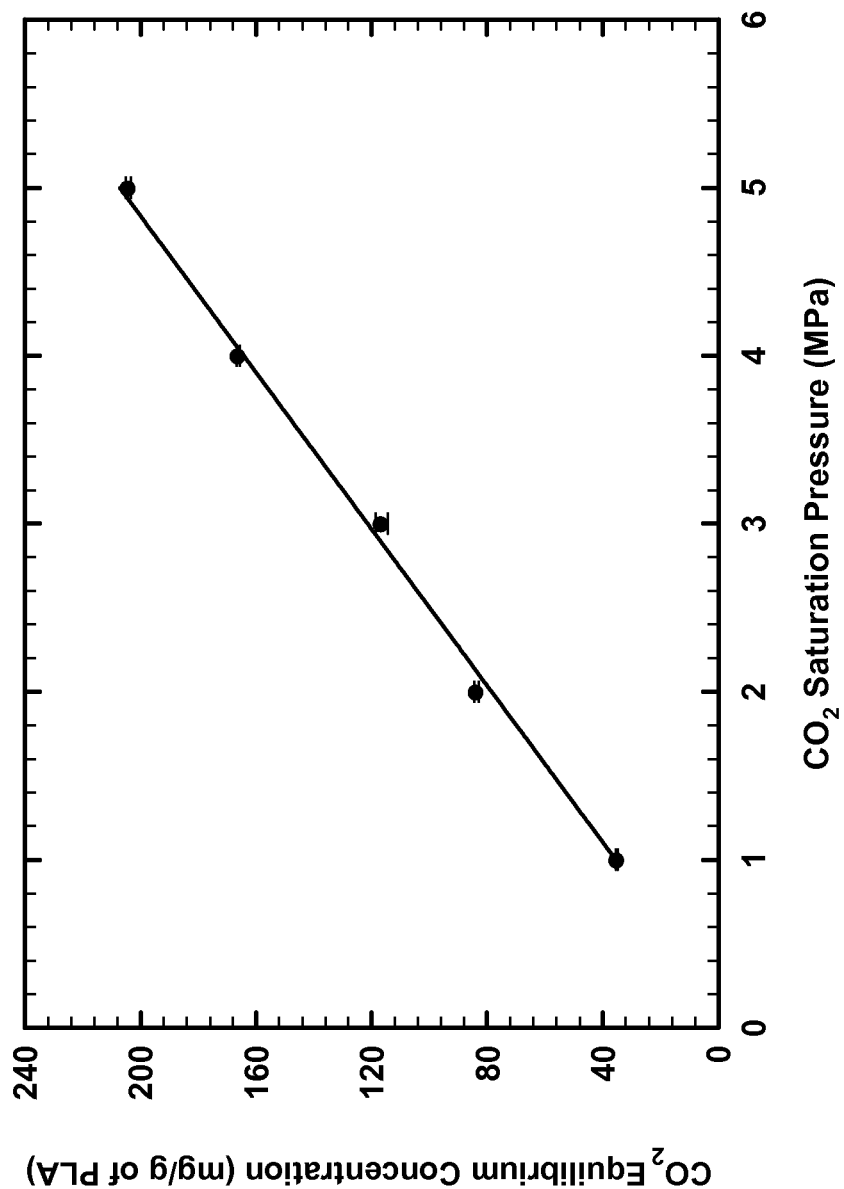
FIG. 5 is graph of the equilibrium carbon dioxide gas concentration in solid PLA as a function of saturation pressure at 20 C, wherein the PLA-$CO_2$ system exhibits behavior consistent with Henry's Law of sorption and has a solubility of 42.93 mg/(g of PLA)/MPa.

FIG. 4 is a diagrammatical illustration of equipment for making 1) the cellular PLA article that is shapeable, and 2) a shaped article from cellular PLA. Rolls of PLA sheet 404 are placed in a pressure vessel 400. The pressure vessel 400 may be sealed and evacuated and/or purged of any remaining air. Carbon dioxide is introduced into the pressure vessel 400. The temperature ($T_{absorb}$) of the pressure vessel 400 is preferably ambient room temperature. However, a higher or lower temperature may be used. The pressure ($P_{absorb}$) of the pressure vessel 400 can be in the range of 2.75-7 MPa, and more particularly in the range of 3-5 MPa. In order to have carbon dioxide fully saturate the inner rolls of the sheet, a porous material, such as paper, can be interleaved between each roll of the sheet. Alternatively, individual flat sheets can be interleaved with the porous material and saturated with gas in a stacked arrangement. A roll is being used merely as a representative material and is not intended to be limiting. The amount of time for complete saturation can be determined beforehand. For example, a test using a sample roll of PLA can be conducted at the same temperature and pressure conditions and at various time intervals. The sample can be pulled from the pressure vessel and measured for weight. When the weight of the sample ceases to increase over time, the sample has reached complete saturation for the given temperature and pressure. The time can be noted, and various tables for complete saturation can be created for any given combination of temperature and pressure conditions. Knowing those conditions, the time that the PLA rolls 404 remain within the pressure vessel can be known. After complete saturation, the PLA rolls 404 can be moved to a cold environment (such as a refrigerator, freezer, etc) 402. The PLA rolls 404 can be treated at a different temperature ($T_{desorb}$). The temperature for desorption can be, for example, −20° C. to 25° C. The pressure ($P_{desorb}$) can be a pressure lower than $P_{absorb}$ and may even be a vacuum. The vessel 402 can be the same or a different vessel than 400. After treatment in vessel 402, the PLA rolls have a minimum crystallinity of 20% by weight and a gas concentration of 6% to 16% by weight. Similar to the testing for the complete saturation of gas, a test can be conducted beforehand, where a completely saturated test roll of PLA is placed in vessel 402, and the test roll is sampled at specified intervals at the specified conditions in order to determine the amount of time necessary for the completely saturated sample roll of PLA to reached the desired crystallinity and gas concentration at the specified temperature and pressure. Knowing the time of desorption for any given combination of temperature and pressure, the amount of time to reach the desired conditions in vessel 402 is known. A PLA roll 404 having the desired crystallinity and gas concentration is placed in a holder, such as holder 405. The solid state foaming equipment is indicated by numerals 408 and 410. This equipment can be a flotation/impingement air oven or infrared oven. The equipment includes an upper section 408 and a lower section 410, wherein the PLA roll 404 is unwound and passed into the flotation/impingement air oven to receive heat from both the upper and lower sections of the oven. At this point, the porous, interleaved material can be discarded. The solid PLA sheet having the desired crystallinity gas and concentration ranges 406 is fed through the flotation/impingement air oven 408, 410. As it traverses the oven, the solid sheet 406 is converted into a cellular PLA sheet 418 having characteristics suitable for thermoforming. The sheet can ride on conveyor rollers 412 and 414 before and after the flotation/impingement air oven to make the process a continuous process. The oven can heat the PLA sheet 418 to a temperature in the range of 40° C. to 100° C., for a duration of between 5 to 300 seconds. The process in FIG. 4 is illustrated as a continuous process, wherein the shaping of cellular PLA is performed following the making of the cellular PLA. However, in other embodiments, the process may include an additional resting period, such as block 428, following the foaming of the cellular PLA to allow the cellular PLA to desorb of essentially all gas before the thermoforming process. Thermoforming is merely described as one representative example of a shaping process and is not intended to be limiting.

The equipment labeled 420 and 422 is representative of a thermoforming machine. The thermoforming machine includes an upper section 420 and a lower section 422. Within the thermoforming machine, a mold or cavity 426 is provided in the shape of the desired thermoformed article. The lower section 422 may be stationary and the upper section 420 may be driven by a press with a negative of the mold 426. Thermoforming machine 420 and 422 can include heating elements (not shown). The heating elements can heat the cellular PLA sheet 418 to a temperature in the range of 160-240° F. before passing into the mold 426. The mold 426 may be heated in the range of 70-150° F. In addition to the press 420 and/or in lieu of the press 420, the lower section of the thermoforming machine 422 can include ducts which apply vacuum to the mold cavity 426 and thus assist in the shaping process. The cellular PLA sheet 418 is carried on conveyor roller 416 to enter the thermoforming machine in a continuous or semicontinuous process from the floatation/impingement air oven. In another alternative embodiment, after the creation of the cellular PLA sheet 418, the sheet 418 can be allowed to desorb of gas to essentially reach 0% by weight of gas concentration before being thermoformed. Shaped cellular PLA articles 424 are produced, such as trays, packaging, etc.

Figure 17:
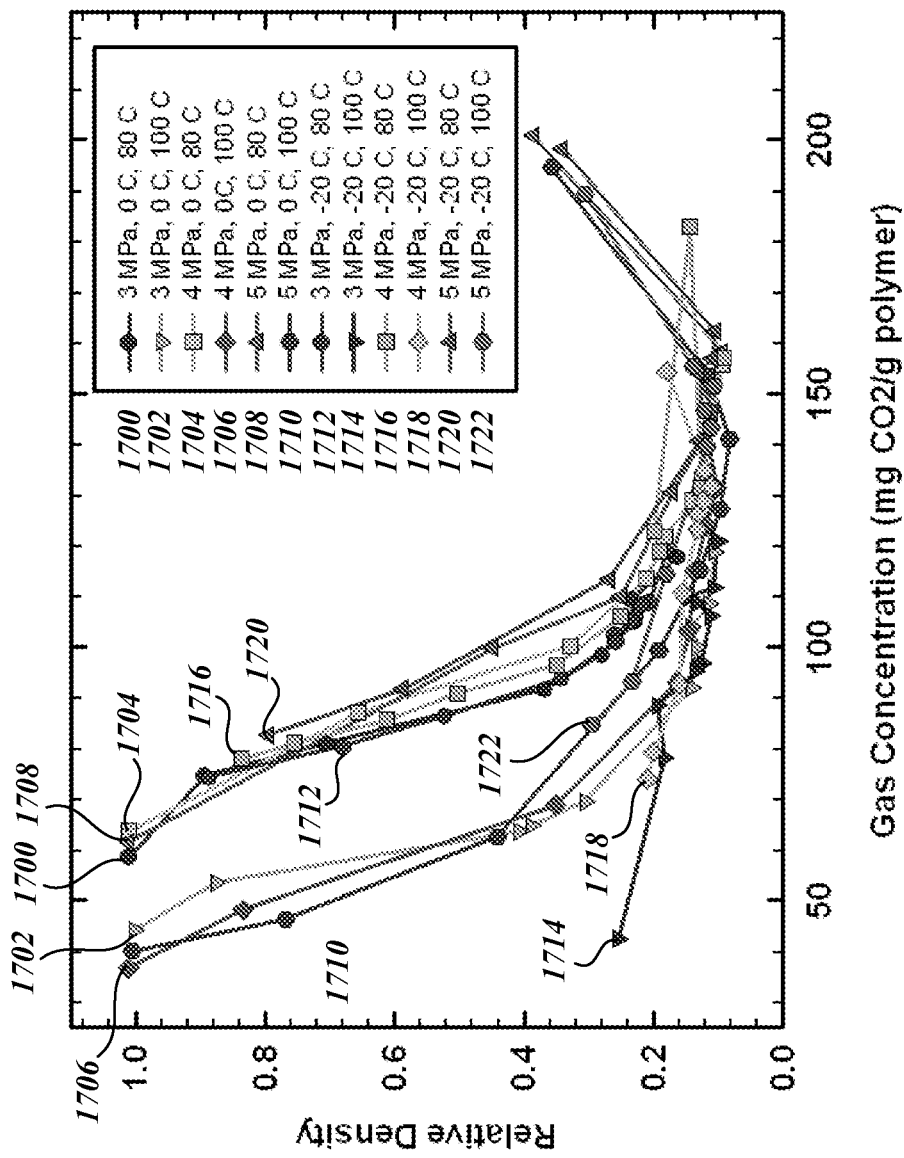
FIG. 17 is a graph of relative density versus gas concentration for samples foamed at 80° C. and 100° C., showing that the relative density is not dependent on saturation pressure or desorption temperature and further showing a shift for different foaming temperatures.
Figure 18:
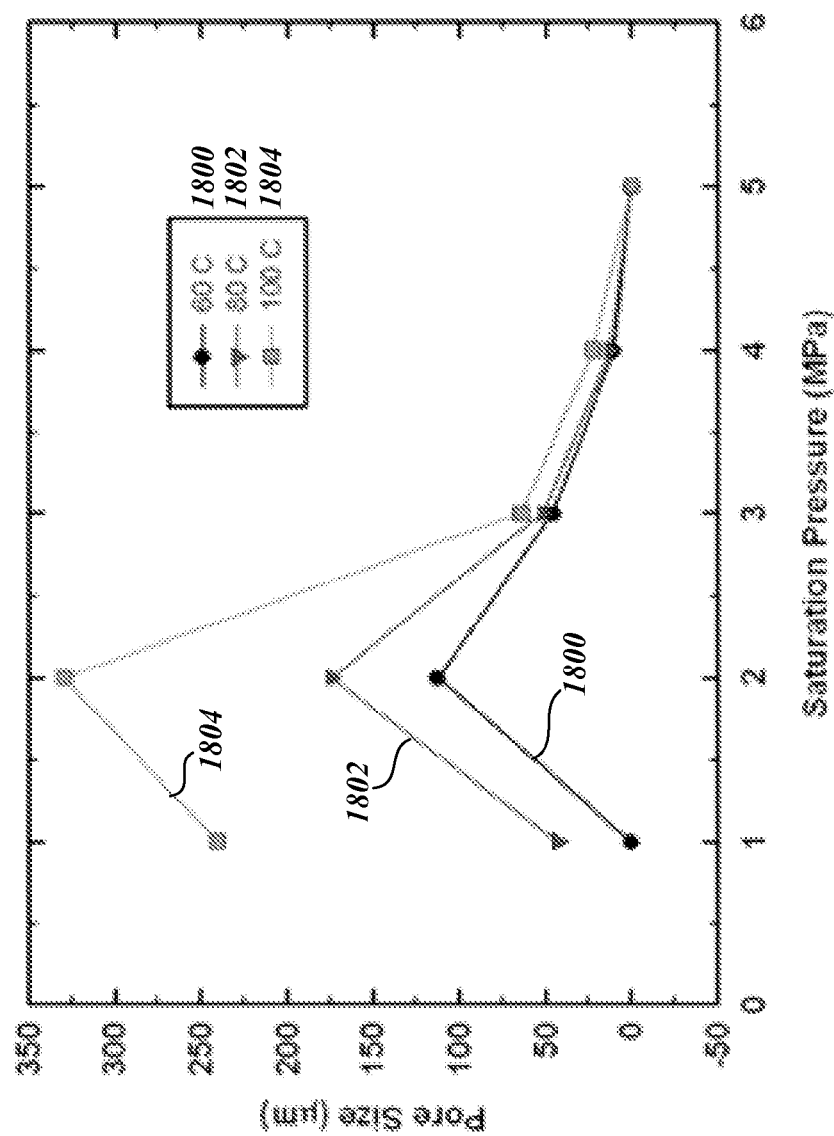
FIG. 18 is a graph of pore size as a function of saturation pressure for microcellular PLA samples foamed in an infrared oven for various foaming temperatures.
Figure 19:
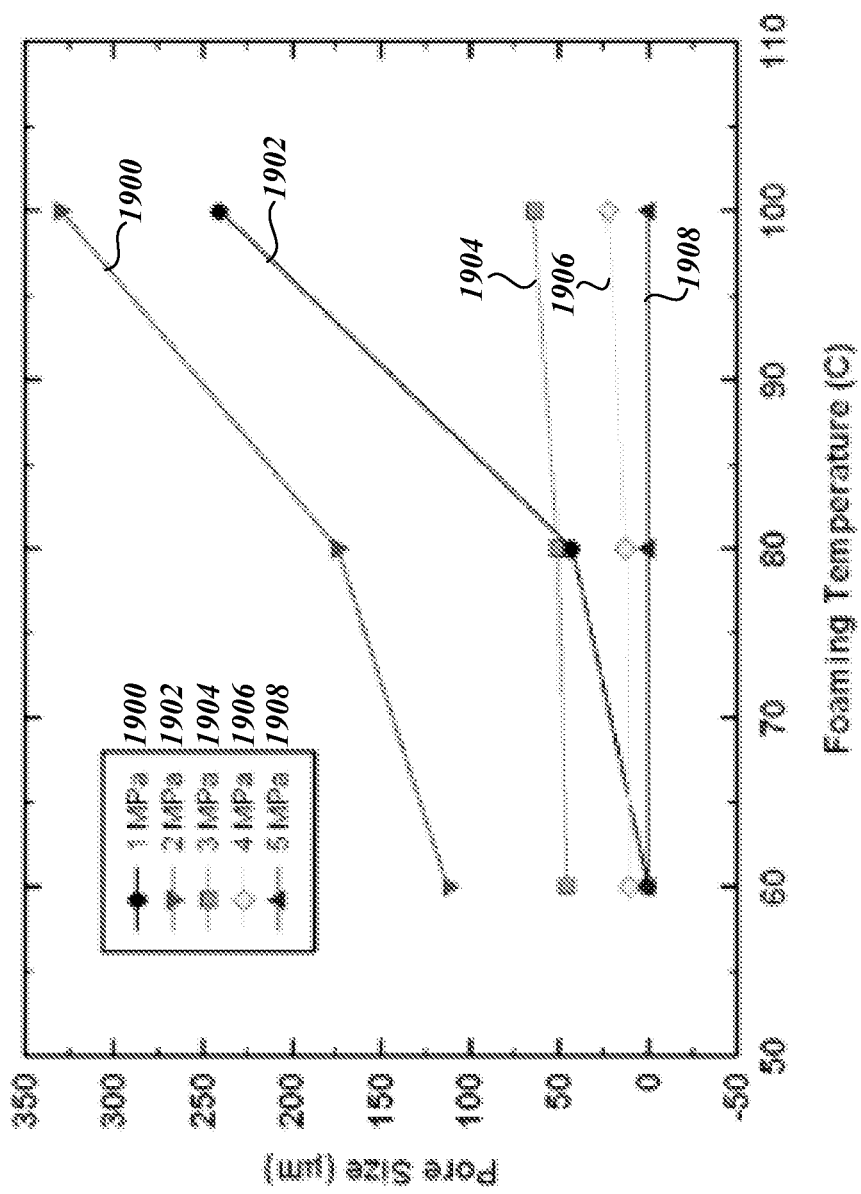
FIG. 19 is a graph of pore size as a function of foaming temperature for microcellular PLA samples foamed in an infrared oven for various saturation pressures.

Referring to FIG. 17, a graph of relative density plotted against gas concentration is illustrated. The data shows that irrespective of desorption temperature and saturation pressure, at a given foaming temperature a sample of a certain gas concentration can be expected to have a certain relative density. This is useful as it provides flexibility in process parameters to achieve a desired density goal. It should be noted, however, that this result will not necessarily hold for lower saturation pressures. Density can be measured according to ASTM standard D792. The flotation weight loss method uses distilled water as the liquid. The sample is first weighed "dry," and then the sample is placed below the surface of the water and weighed again. The equation used to calculate the density of the polymer sample is:

$$D = \left(\frac{W_d}{W_d - W_w}\right) \cdot D_w \quad (1)$$

where,
D=density of the sample
$W_d$=dry weight
$W_w$=wet weight
$D_w$=density of distilled water (taken as 0.9975 g/cm$^3$)

Density is reported as relative density or void fraction. Relative density is the density of the foamed material divided by the density of the unfoamed material. Void fraction is defined as one minus the relative density. Both relative density and void fraction are expressed as a percentage. For example, a material with 60% relative density means that the total volume of the foamed sample is 60% polymer and 40% air. At a given relative density this would have a large effect on bubble size, appearance, feel and shapeability of the cellular PLA, as the crystallinity in the material at a given gas concentration changes the way the material expands. At approximately below 20% crystallinity, large bubbles (above 100 μm) are formed in the cellular PLA. This is due to two reasons 1) fewer crystallites exist in the material leading to fewer nucleation sites for bubbles and 2) the crystalline matrix does not prevent the continued bubble growth in the amorphous regions of the polymer. These large bubbles lead to a coarse looking foam sheet (or article) that is flexible, mostly translucent and incapable of making a rigid shaped article upon thermoforming.

However, at or above 20% crystallinity bubbles are in the microcellular range (below 100 μm). This is because 1) there are significantly more crystallites and hence nucleations sites available for bubble formation and 2) the crystallite network arrests bubble growth in the amorphous regions of the polymer by reducing molecular mobility. These microcellular bubbles lead to a fine looking cellular PLA sheet with integral skin that is rigid, mostly opaque and capable of being shaped into a rigid shaped article upon thermoforming.

The relative density versus gas concentration plots also indicate that the reason for the vastly different and unsuitable morphology of the 5 MPa samples at low desorption times may be only due to the high gas concentration in the sample. In other words, at approximately 16% by weight of gas (carbon dioxide) concentration (and higher), the diffusivity of $CO_2$ in PLA is so high that the expanding PLA sheet undergoes an explosive collapse in bubble structure that results in relative densities higher than 40% and a collapsed bubble structure. At approximately 6% gas concentration and below, there is not enough gas to create small cells to achieve a rigid, integral skinned and shapeable cellular PLA sheet (generally, the lower the gas concentration the larger the cells and vice versa). Hence, the gas concentration for creating shapeable PLA sheets is below 16% by weight of carbon dioxide gas concentration, and above 6% by weight in order to achieve at least a relative density of 40% along with cells below 100 μm compared to the noncellular PLA.

Figure 6:
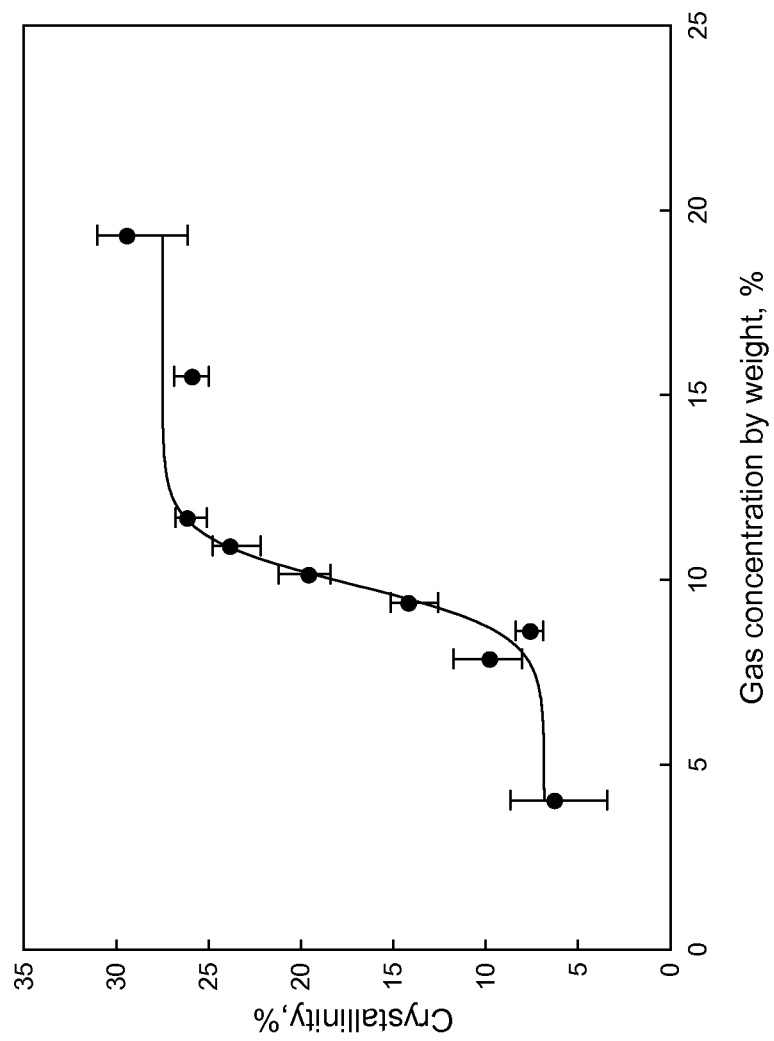
FIG. 6 is graph of percent crystallinity by weight for $CO_2$ saturated solid PLA after saturation and prior to foaming as a function of the gas concentration upon achieving equilibrium saturation.

FIG. 6 is graph of percent crystallinity by weight for $CO_2$ saturated solid PLA after saturation and prior to foaming as a function of the gas concentration upon achieving equilibrium saturation.

Figure 7:
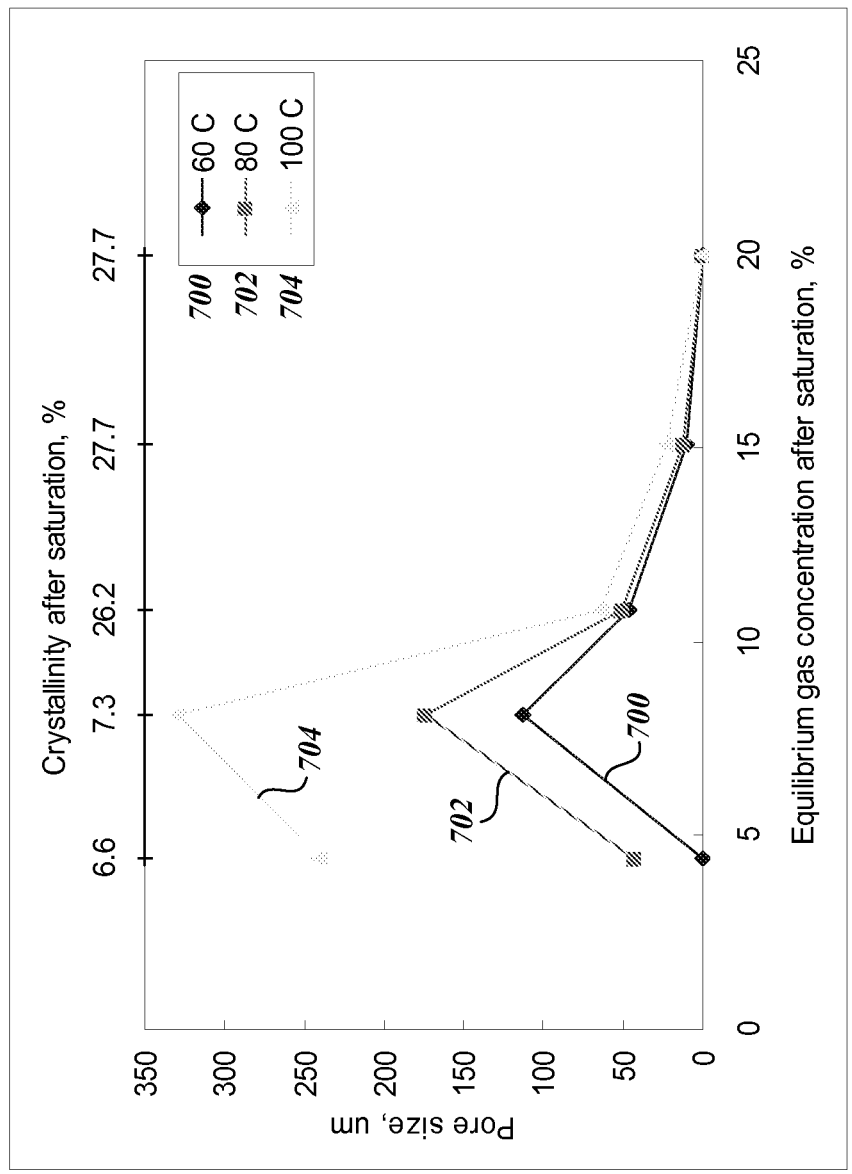
FIG. 7 is a graph of bubble (cell or pore) size after foaming as a function of equilibrium gas concentration after saturation for microcellular PLA samples foamed at various foaming temperatures and also showing the crystallinity that resulted after saturation and prior to foaming for these samples on the top axis.
Figure 20C:
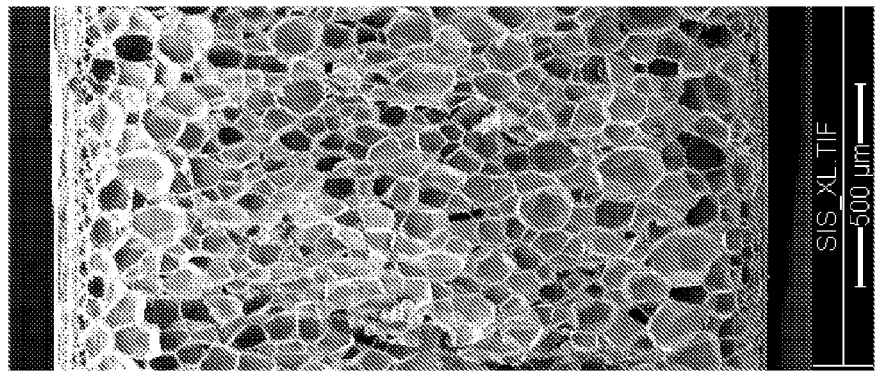
FIGS. 20A,B,C are cross sectional scanning electron micrographs of representative samples of cellular PLA.
Figure 20B:
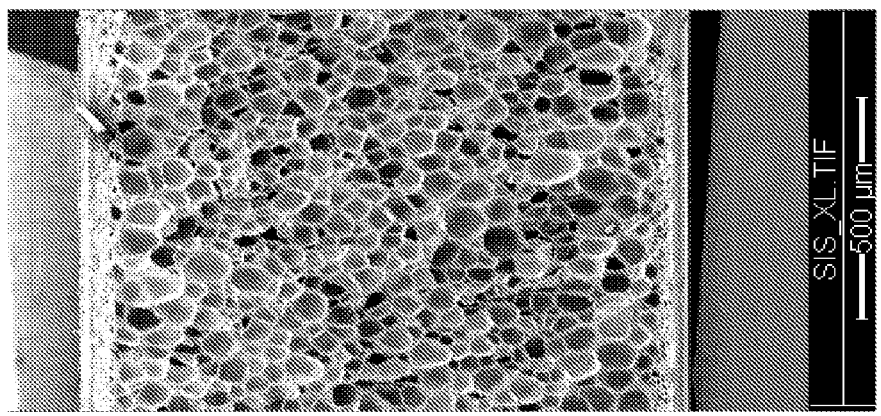
Figure 20A:
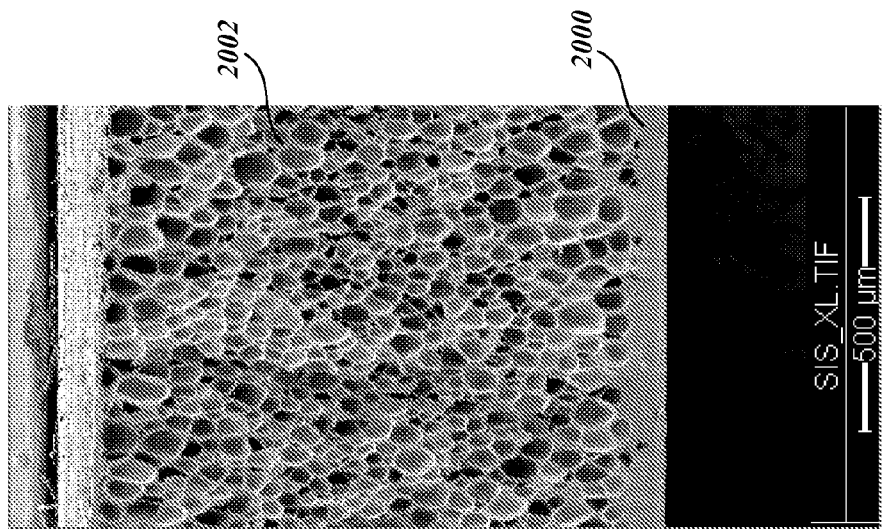
Figure 21:
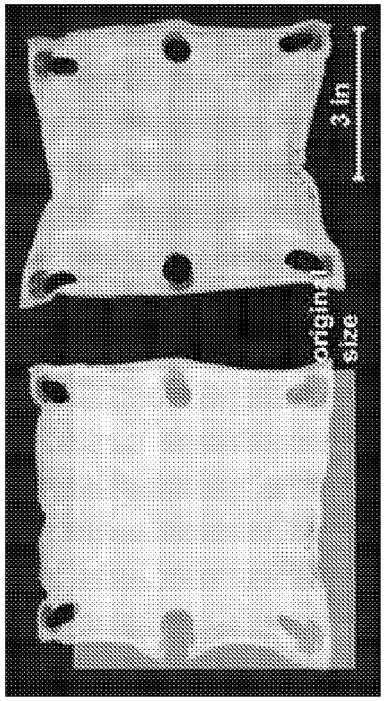
FIG. 21 is a photograph of samples saturated at 5 MPa and heated to 40 C in infrared.
Figure 22:
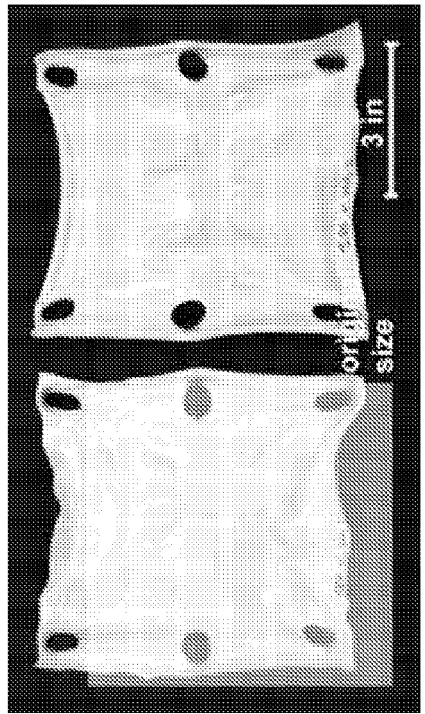
FIG. 22 is a photograph of samples saturated at 5 MPa and heated to 60 C in infrared.
Figure 23:
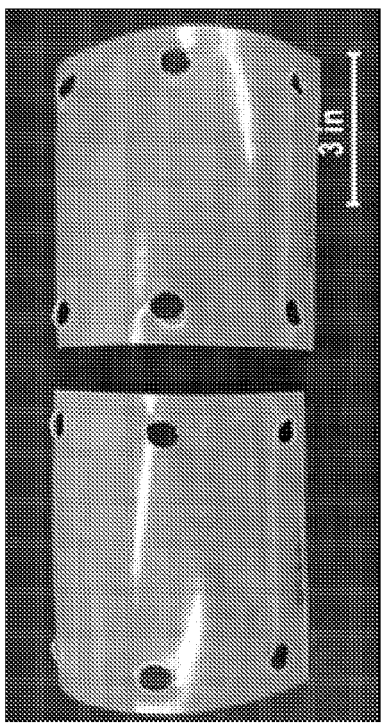
FIG. 23 is a photograph of samples saturated at 5 MPa and heated to 80 C in infrared.
Figure 24:
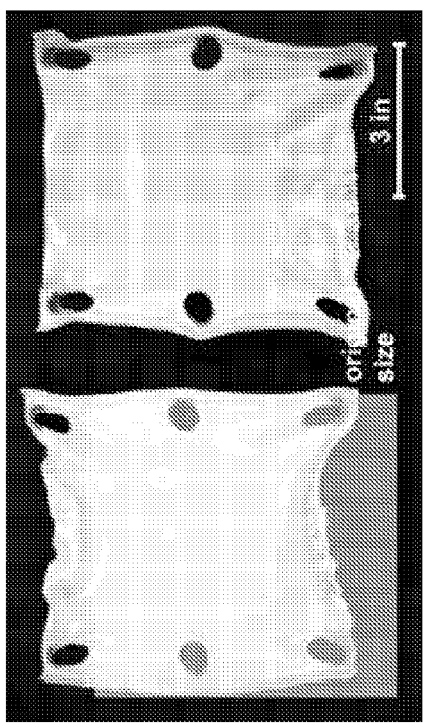
FIG. 24 is a photograph of samples saturated at 5 MPa and heated to 100 C in infrared.
Figure 26:
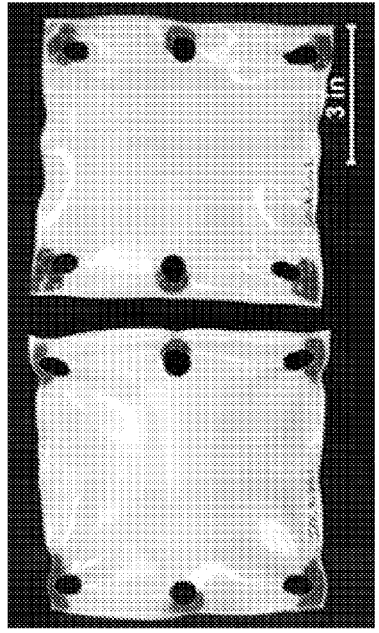
FIG. 26 is a photograph of samples saturated at 4 MPa and heated to 60 C in infrared.
Figure 28:
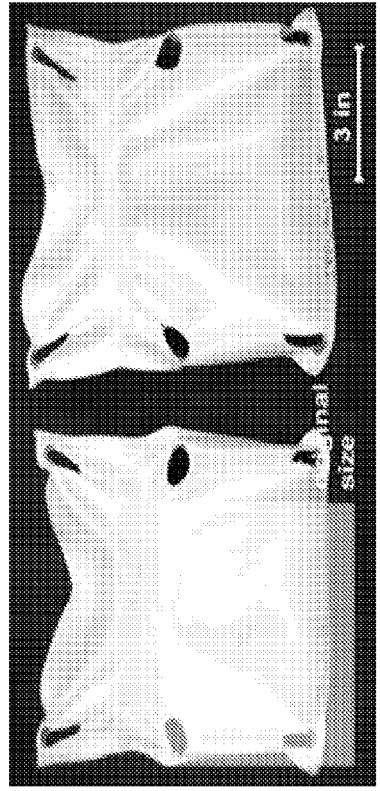
FIG. 28 is a photograph of samples saturated at 4 MPa and heated to 100 C in infrared.
Figure 25:
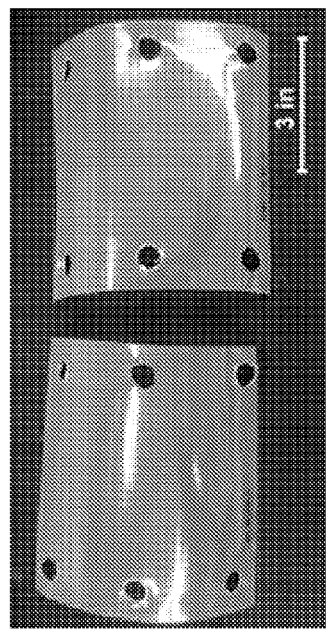
FIG. 25 is a photograph of samples saturated at 4 MPa and heated to 40 C in infrared.
Figure 27:
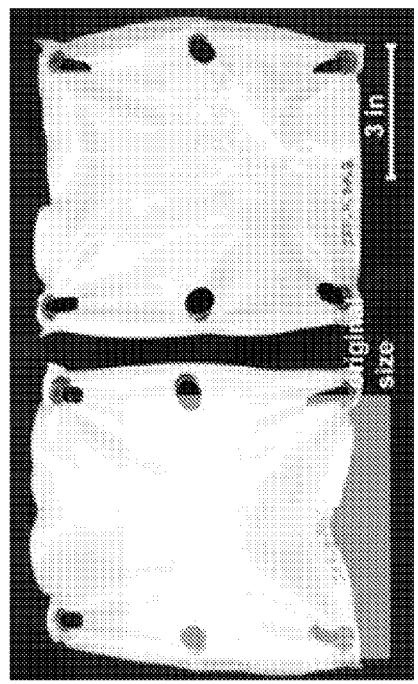
FIG. 27 is a photograph of samples saturated at 4 MPa and heated to 80 C in infrared.
Figure 34:
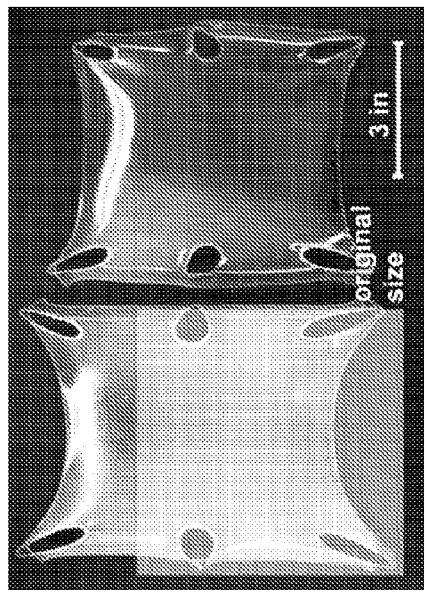
FIG. 34 is a photograph of samples saturated at 2 MPa and heated to 60 C in infrared.
Figure 33:
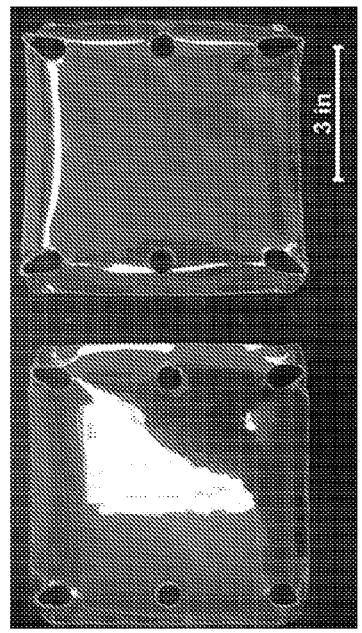
FIG. 33 is a photograph of samples saturated at 2 MPa and heated to 40 C in infrared.
Figure 36:
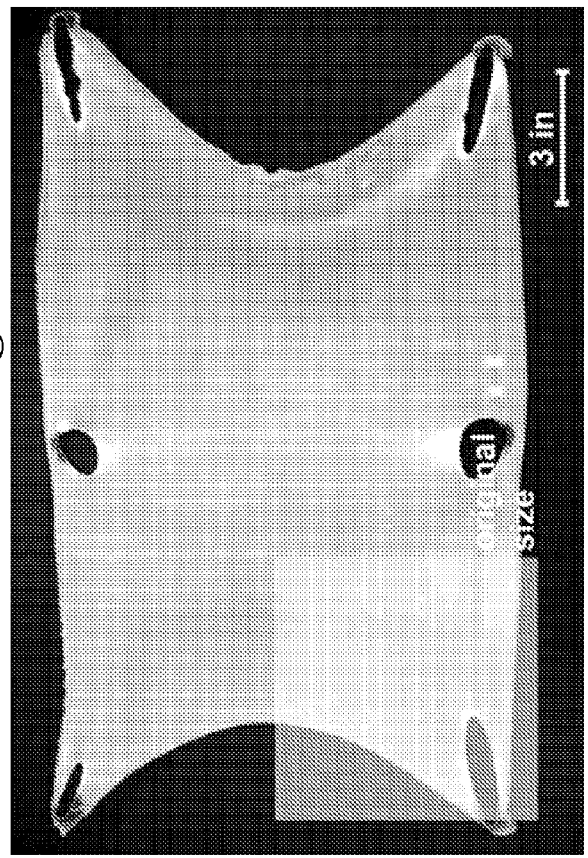
FIG. 36 is a photograph of sample 1 (FIG. 33, left) saturated at 2 MPa and heated to 100 C in infrared.
Figure 35:
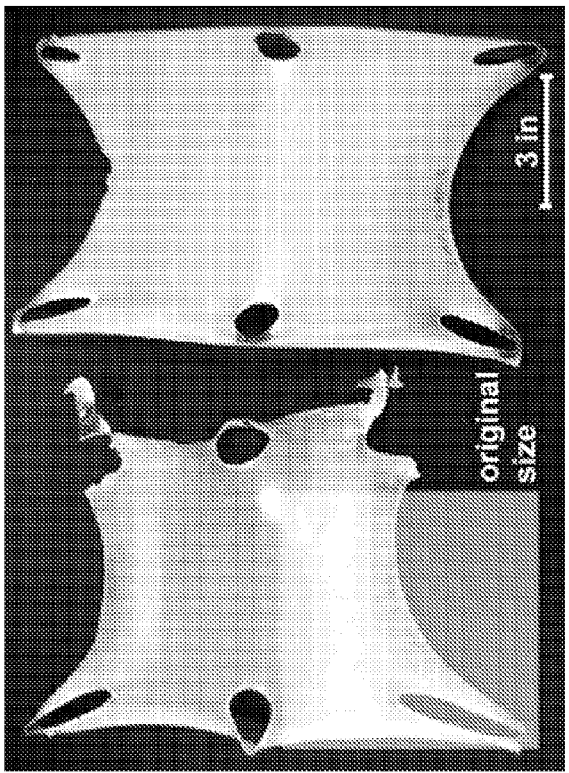
FIG. 35 is a photograph of samples saturated at 2 MPa and heated to 80 C in infrared.
Figure 37:
FIG. 37 is a photograph of sample 2 (FIG. 33, right) saturated at 2 MPa and heated to 100 C in infrared.

FIG. 7 is a graph of bubble (cell or pore) size after foaming as a function of equilibrium gas concentration after saturation for microcellular PLA samples foamed at various foaming temperatures and also showing the crystallinity that resulted after saturation and prior to foaming for these samples on the top axis. The characterization of microcellular structures can be performed by imaging the structures with a scanning electron microscope (SEM), such as a digital FEI Siriron scanning electron microscope. Samples can be scored and freeze fractured with liquid nitrogen. Samples can then be mounted in metal stages and the imaged surface sputter coated with Au—Pd for between 20 to 60 seconds. When reporting the size of cells, the measurement is of the cell's largest dimension. FIGS. 20A, B, and C show representative samples of cellular PLA, showing the internal cellular PLA structure 2002 and the integral and noncellular PLA layer 2000.

Figure 8:
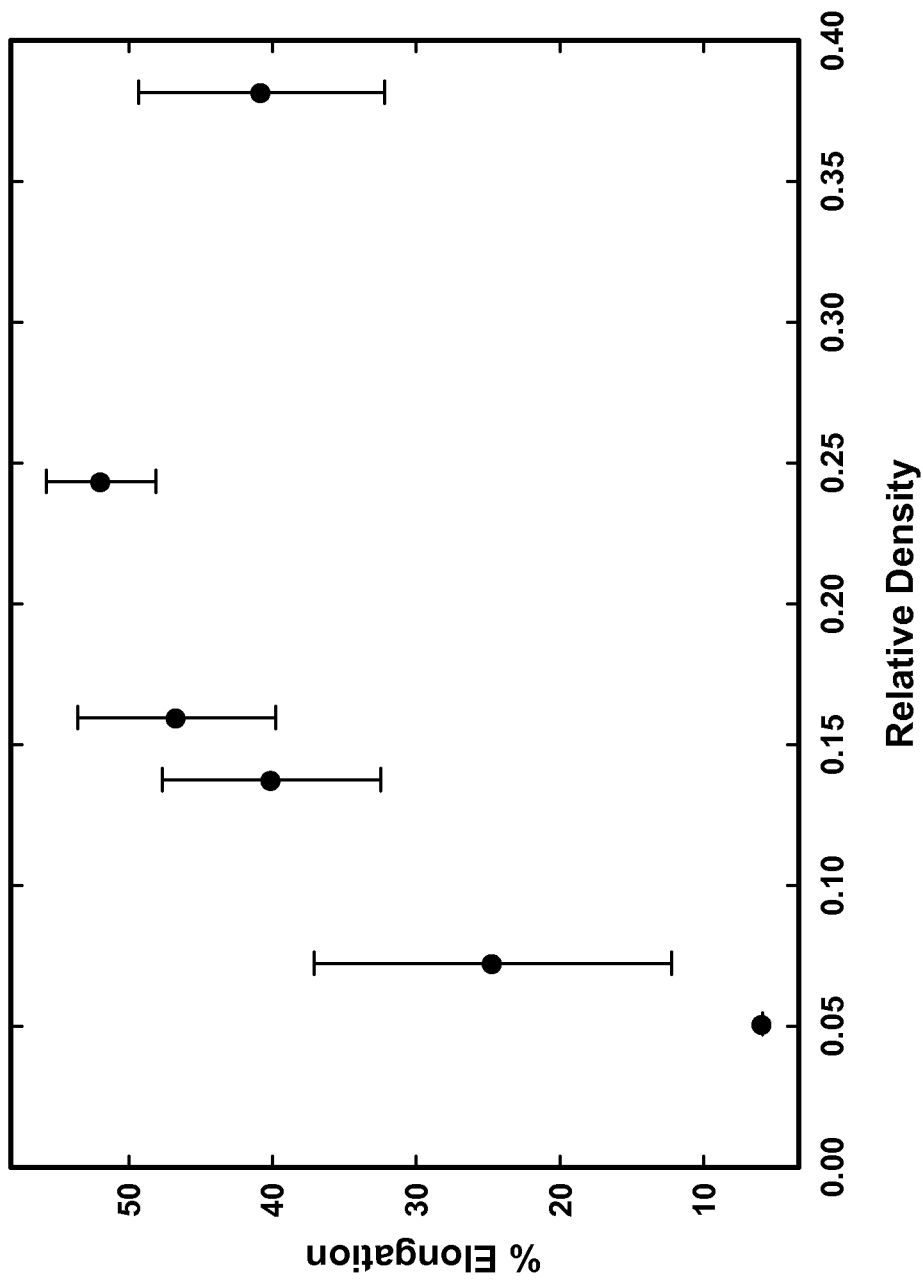
FIG. 8 is graph of percent tensile elongation at break for solid-state microcellular PLA as a function of relative density.

FIG. 8 is graph of percent tensile elongation at break for solid-state microcellular PLA as a function of relative density. Tensile testing generally requires the application of a gradually increasing uniaxial stress until the propagation of a single crack causes failure. Samples for tensile testing can be manufactured according to ASTM D638 Type IV specifications. Testing of these samples can follow ASTM D638. Tensile testing can be performed on any suitable equipment, such as an Instron 5585H. In this apparatus, serrated jaws hold the tensile samples. A constant crosshead rate is used to control the amount of stress applied to the polymer samples.

EXAMPLE

The following example demonstrates the creation of a cellular PLA article that is shapeable.

1. Material

Extruded PLA sheet, thickness 0.60 mm (=0.024 inch), made by Ex-Tech Plastics was procured for this example. The resin from which the sheet was extruded is PLA 2002D (FG grade) and was made by NatureWorks™ LLC. In the as received condition, Ex-Tech reported that the material has a density of 1.24 g/cm³ (=1240 kg/m³=77.4 lb/ft³) and a $T_g$ of 55° C. (=131 F). The PLA sheet was prepared into 38.1 mm×38.1 mm (1.5 inch×1.5 inch) square samples. The samples were used in these experiments in the as-received condition.

2. Experimental 2.1 Equipment

For the gas saturation step, a 101.6 mm (=4 inch) diameter and 101.6 mm (=4 inch) deep carbon steel pressure vessel was used. The pressure vessel is rated for use up to a maximum pressure of 10.34 MPa (=1500 psi) at 0 C (=32 F). The pressure inside the vessel was regulated using an OMEGA CN8500 process controller with a resolution of ±0.01 MPa (=1.45 psi). A Mettler-Toledo AE240 precision balance with an accuracy of 10 μg (=2.2E-9 lb) was used to measure the gas solubility and relative density. The foaming was carried out in a heated circulating water bath controlled by a Techne TE-10D heater/circulator with a working temperature range of ambient +5 to 120° C. and set point accuracy of ±1° C. The samples were desorbed in a temperature controlled freezer made by Freezer Concepts Inc., model CT30-2. The PID controller for the freezer is by FutureDesign Controls with an accuracy of +/−2 C at 25 C.

2.2 Procedure

Solid PLA samples (38.1 mm×38.1 mm) were saturated to equilibrium concentration at the various saturation pressures (3, 4 and 5 MPa) with $CO_2$ gas. The samples were removed two at a time (with the pressure vessel re-sealed and re-pressurized after each removal). The mass of the two samples was measured immediately after depressurization and then the samples were foamed for 2 minutes in the circulating water bath. The mass of the samples prior to saturation was recorded for calculation of $CO_2$ concentration prior to and after foaming. Once the samples were saturated, they were removed from the pressure vessel, their weights were recorded, and then placed in a plastic bag in a freezer that was set to the appropriate temperature by a PID controller. The samples were then removed at regular intervals, the mass recorded again (after condensation had evaporated from the sample surface), and then foamed at the appropriate temperature for two minutes in the temperature controlled, circulating water bath. After foaming the density of each of the samples was measured according to ASTM standard D792-91 and other observations of the quality of the foam were noted. The samples' density was measured after a significant amount of time had passed such that the residual gas concentration in the expanded microcellular PLA samples was negligible. Table 1 lists the set numbers and processing conditions. In this example, three saturation pressures of 3, 4 and 5 MPa, two desorption temperatures of 0 C and −20 C and two foaming temperatures of 80 C and 100 C are described.

TABLE 1

SAMPLE SETS AND PROCESSING CONDITIONS

| Sample Set ID | Saturation Pressure (MPa) | Desorption Temp. (C.) | Foaming Temp (C.) |
| --- | --- | --- | --- |
| D | 3 | 0 | 80 |
| E | 3 | −20 | 80 |
| F | 4 | 0 | 80 |
| G | 4 | −20 | 80 |
| H | 4 | 0 | 100 |
| I | 4 | −20 | 100 |

TABLE 1-continued

SAMPLE SETS AND PROCESSING CONDITIONS

| Sample Set ID | Saturation Pressure (MPa) | Desorption Temp. (C.) | Foaming Temp (C.) |
| --- | --- | --- | --- |
| J | 3 | 0 | 100 |
| K | 3 | −20 | 100 |
| L | 5 | 0 | 100 |
| M | 5 | −20 | 100 |
| N | 5 | 0 | 80 |
| O | 5 | −20 | 80 |

2.3 Observations

A large number of samples (a total of 230) were prepared for and processed during this set of experiments in order to get a detailed view of the combined effects of saturation pressure, desorption time, desorption temperature, and foaming temperature.

Several effects were observed in a few of the sample groups. During foaming a few of the samples blistered from the inside and these internal blisters had sizes between 2 mm and 20 mm. These blisters were seen intermittently in all groups of samples except for the sets listed in Table 2. A clear trend for these large internal blisters was not apparent when scrutinizing all of the samples. As a general trend the internal blisters appeared with shorter desorption time and higher gas concentration.

Another effect that was observed was the appearance of small surface blisters that cause surface roughness. At 5 MPa, the surface blisters were very apparent and uniformly distributed across the surface of the samples that had short desorption times. This effect is a result of violent out-gassing of $CO_2$ (due to high diffusivity of $CO_2$ in PLA at high gas concentrations) during the foaming step. This effect is driven by the high gas concentration in the 5 MPa samples of short desorption times which is much higher than in other samples. A similar phenomenon of surface roughness is seen at lower pressures (below 2.75 MPa) but is a much more subtle effect caused by the thin solid skin that results in samples that are not desorbed for long and thus the bubbles that form under the surface deform the skin and give it a rough appearance.

The oddest result that was observed among all the expanded PLA samples was the non-uniformity of foaming in most of the 5 MPa saturated samples. After foaming there appeared an off-centered region (about 25% of the total sample area) that was of much higher density than the rest of the sample. The cause of this irregularity is unclear.

TABLE 2

SAMPLE SETS IN WHICH BLISTERS WERE NOT OBSERVED

| Sample Set | Saturation Pressure (MPa) | Desorption Temp. (C.) | Foaming Temp (C.) |
| --- | --- | --- | --- |
| D | 3 | 0 | 80 |
| E | 3 | −20 | 80 |
| F | 4 | 0 | 80 |
| G | 4 | −20 | 80 |
| N | 5 | 0 | 80 |

3. Results and Discussion

Along with visual observation on aesthetics, for each of the sample sets, the relative density was measured. For each sample set, the relative density was first correlated with desorption time and saturation pressure. This data is displayed in FIGS. 9-11. Desorption time is given on a log scale to better depict the effects at short desorption times. All three graphs shown in FIGS. 9-11 display the same trend in their data; the curves are shifted to the right with increasing foaming temperature and decreasing desorption temperature. This means that an increase in foaming temperature reduces the relative density and a lower desorption temperature slows gas desorption out of the sample resulting in a lower relative density when foamed.

Figure 9:
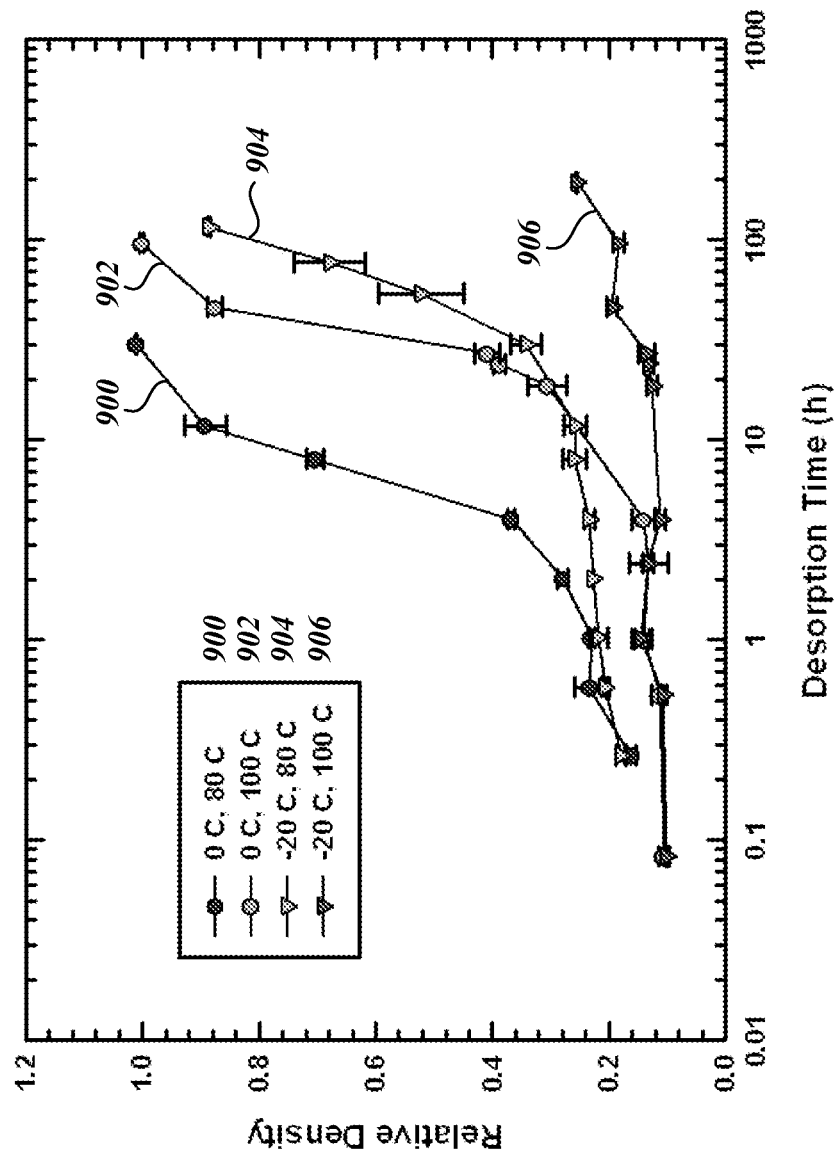
FIG. 9 is a graph of relative density versus desorption time for microcellular PLA samples processed at 3 MPa $CO_2$ saturation pressure and various desorption and foaming conditions, wherein each of the data points is an average density of two samples and the error bars show difference in the densities of the two samples.
Figure 10:
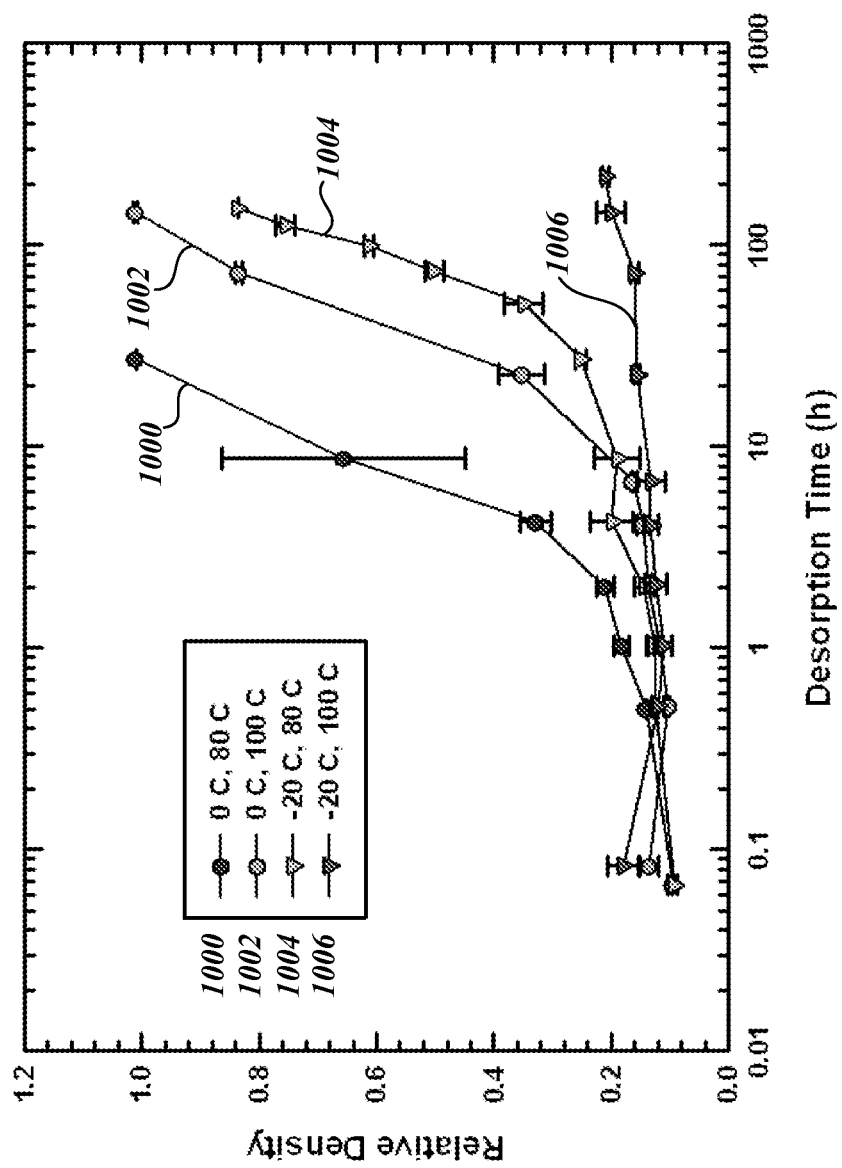
FIG. 10 is a graph of relative density versus desorption time for 4 MPa samples, wherein data points are the average of two sample measurements and the error bars show difference in the sample values.
Figure 11:
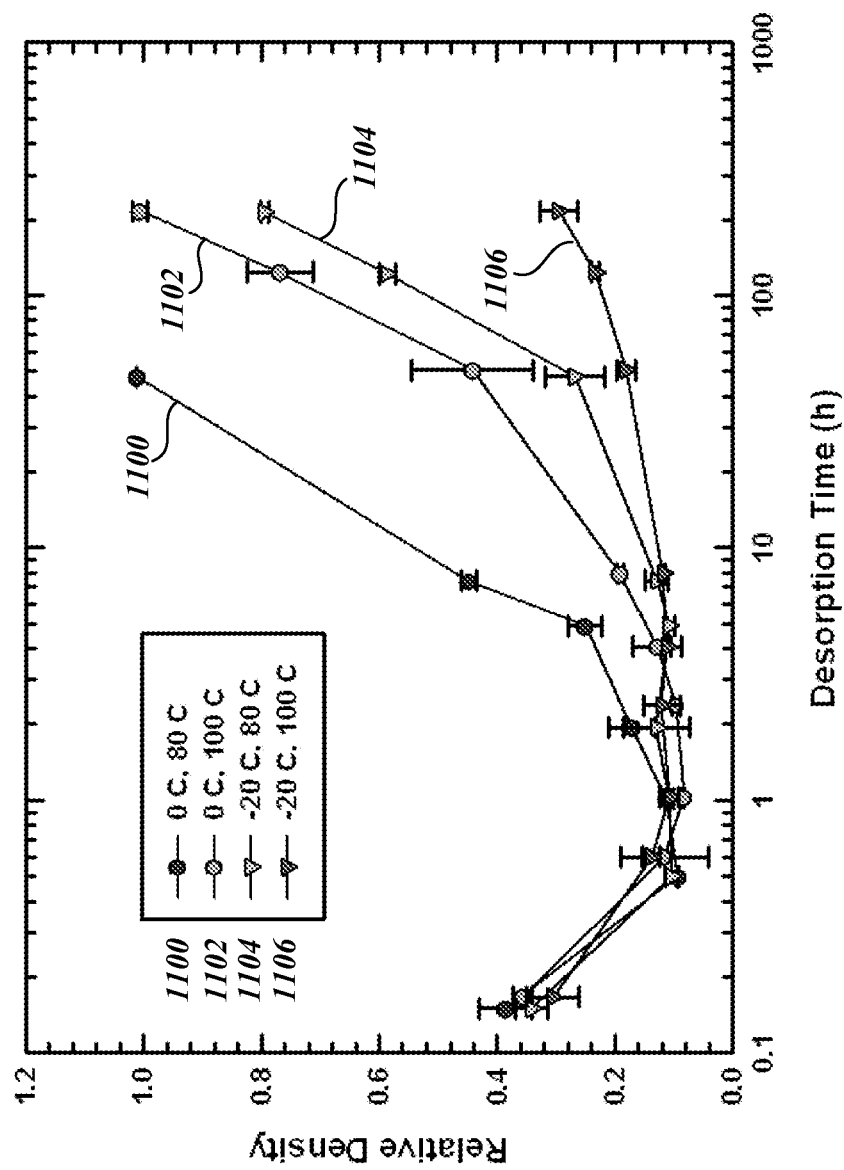
FIG. 11 is a graph of relative density versus desorption time for 5 MPa samples, wherein data points are the average of two sample measurements and the error bars show difference in these sample values.
Figure 12:
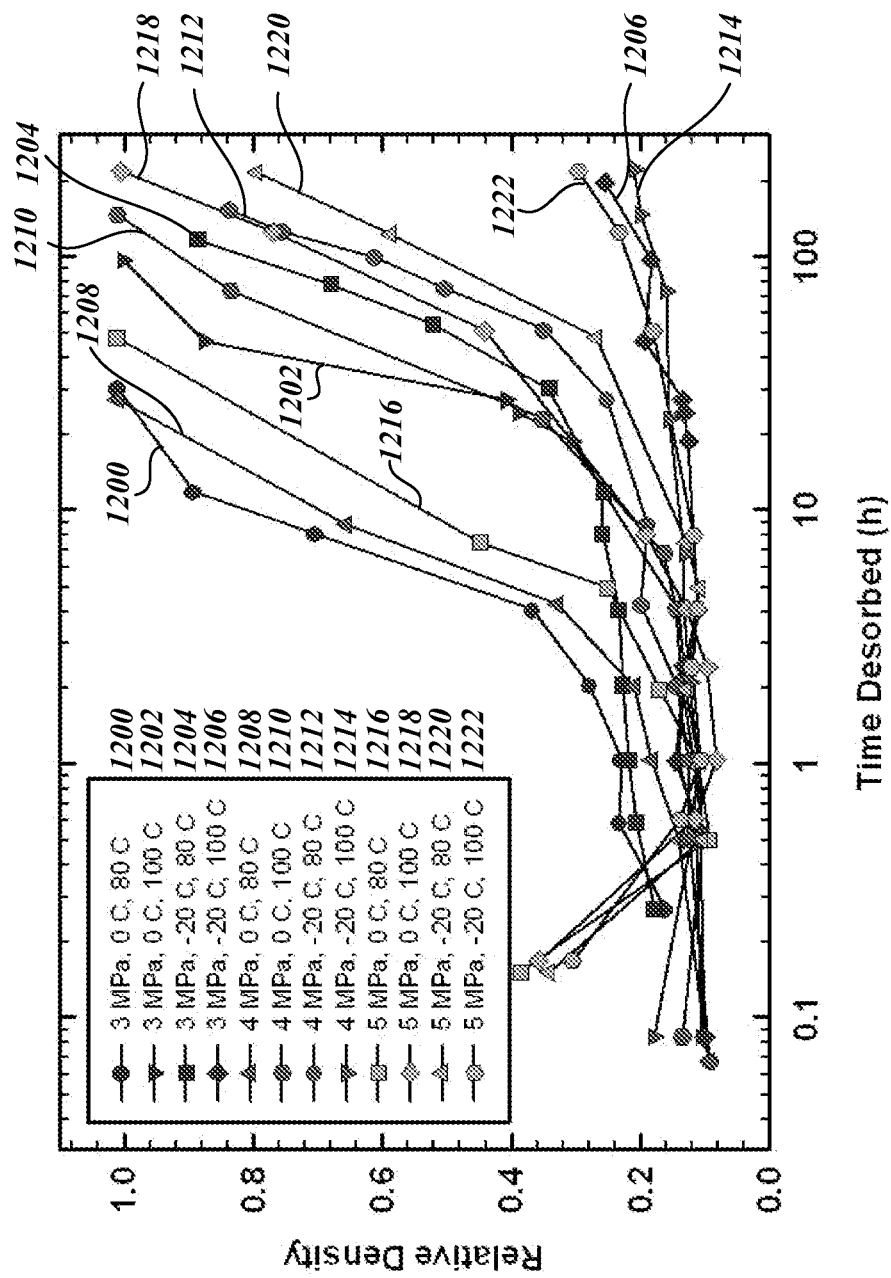
FIG. 12 is a graph of the relative density versus desorption time for all pressures (3, 4, and 5 MPa) grouped by desorption and foaming conditions with higher foaming and lower desorption temperatures shifting the curves to the right.

To better visualize these trends, all the data was plotted on the same graph as shown in FIG. 12. It is clear that desorption and foaming temperatures have a more dominant effect on relative density at high desorption times than saturation pressure. The plots are clustered by the paired parameters of foaming temperature and desorption temperature with samples desorbed at 0 C and foamed at 80 C having higher relative density and samples desorbed at −20 C and foamed at 100 C having lower relative density. Close inspection of FIGS. 9-11 shows that the most dominant parameter is desorption temperature. For samples processed with −20 C desorption temperature a processing window exists in which a certain low relative density may be attained. For a relative density of around 10%, this desorption time window is 3, 6, and 8 hours for 3, 4, and 5 MPa saturation pressures respectively.

Figure 13:
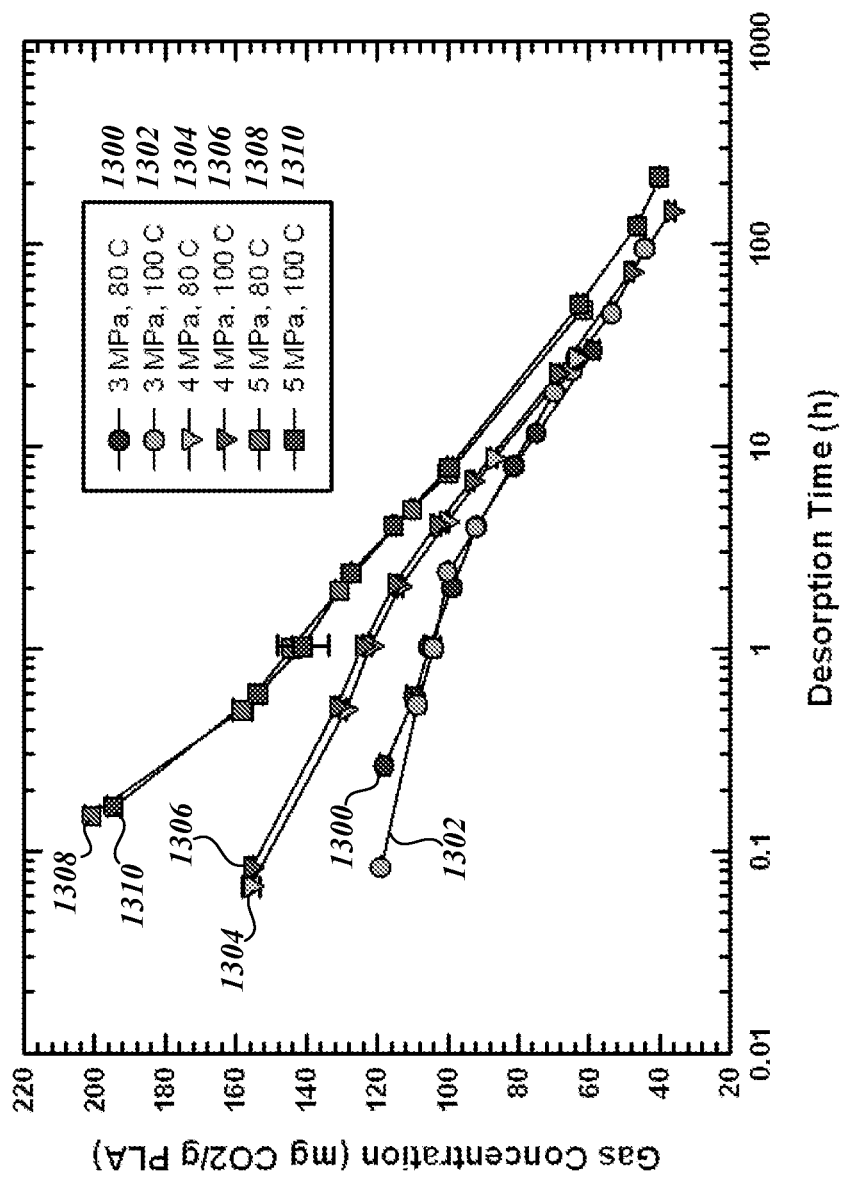
FIG. 13 is a graph of gas concentration of samples desorbed at 0° C. just prior to foaming as a function of desorption time, wherein foaming temperature is indicated for each trend only as a sample identifier and has no effect on the data as the gas concentration was measured before foaming.
Figure 14:
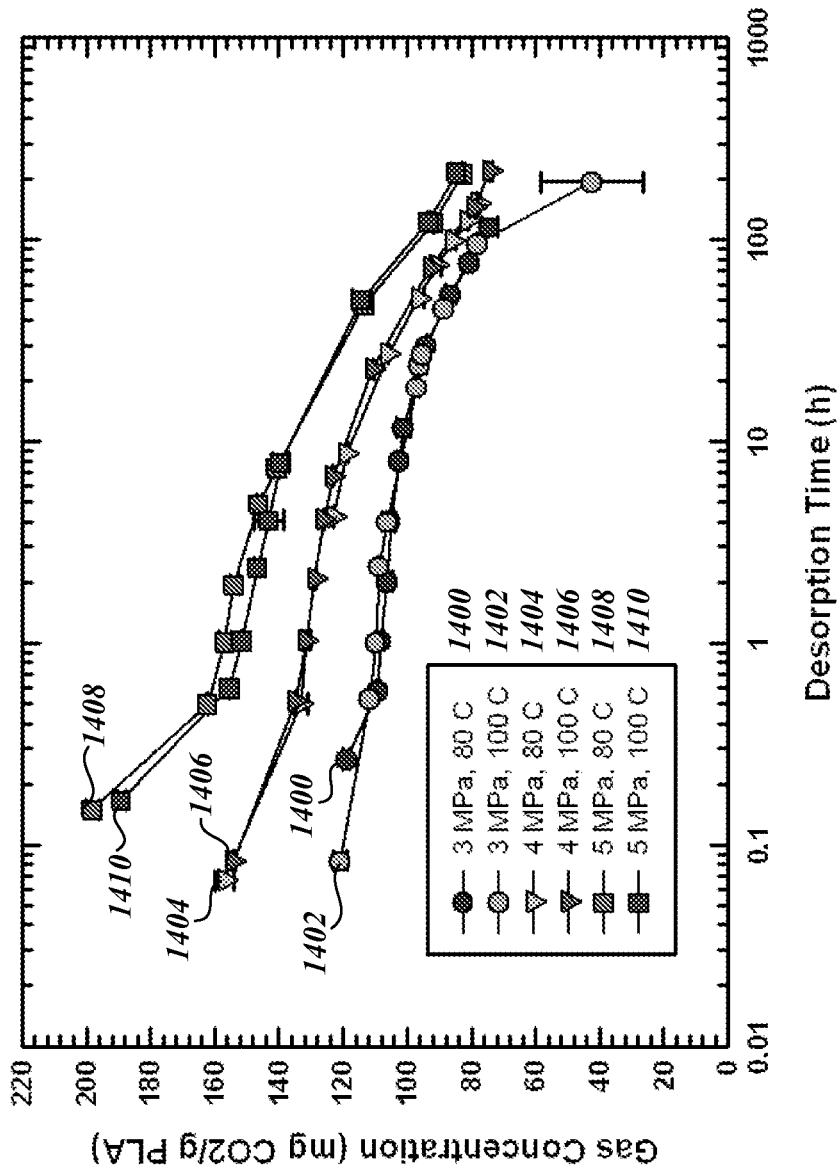
FIG. 14 is a plot of gas concentration of samples desorbed at −20° C. just prior to foaming as a function of desorption time, wherein foaming temperature is indicated for each trend only as a sample identifier and has no effect on the data as the gas concentration was measured before foaming (the low point on the graph is an outlier)

For each desorption temperature, the gas concentration versus desorption time data was also plotted (FIGS. 13 and 14). The gas concentration was obtained by recording the mass of the samples prior to saturation and prior to foaming. Thus this gas concentration calculation is of the gas saturated and desorbed PLA sheet just before foaming. The data is identified by the temperature that the samples were to be foamed at, but this is mostly irrelevant as the gas concentration is from pre-foamed samples. The graphs show that gas desorbs more slowly at −20 C and both graphs seem to be converging to zero gas concentration. This means that after a certain period of desorption, a sample from a certain saturation pressure cannot be distinguished from another sample from a different saturation pressure. The smaller slope of the −20 C desorption is the reason that these samples show a lower density for a longer period of time.

Figure 15:
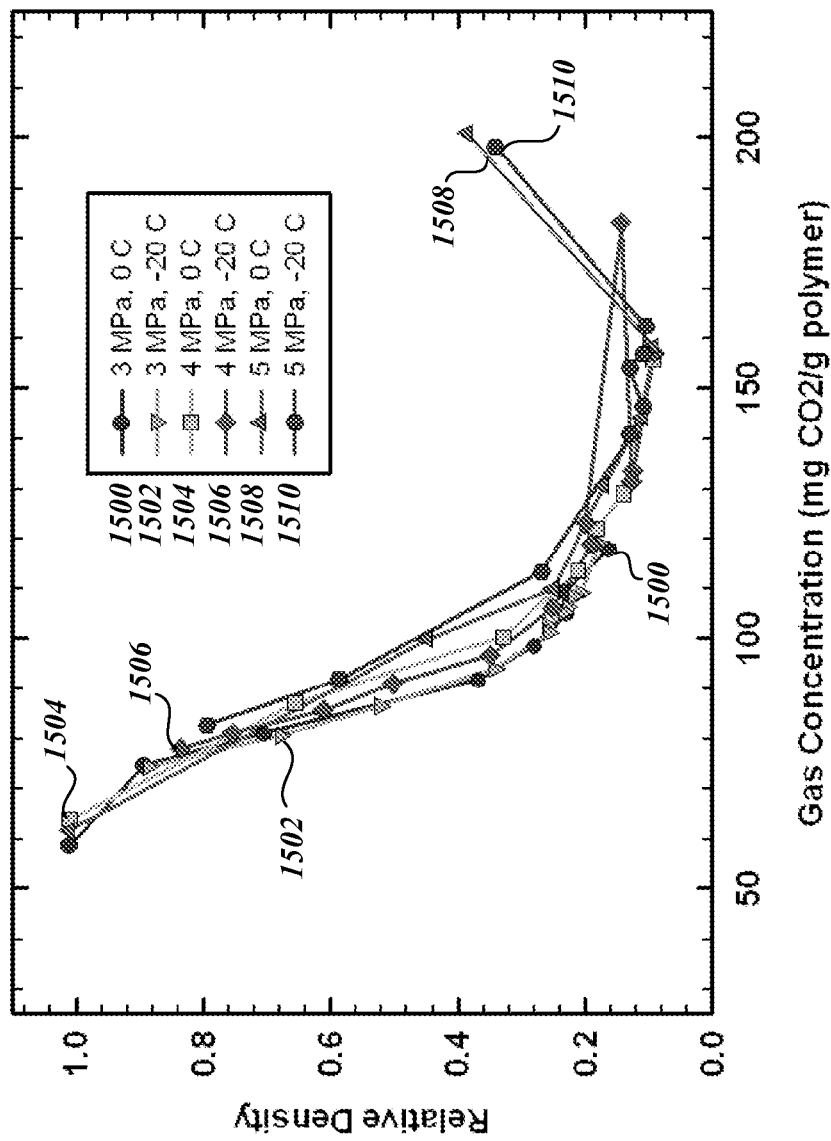
FIG. 15 is a plot of relative density versus gas concentration for samples foamed at 80° C., showing that the relative density is not dependent on saturation pressure or desorption temperature.
Figure 16:
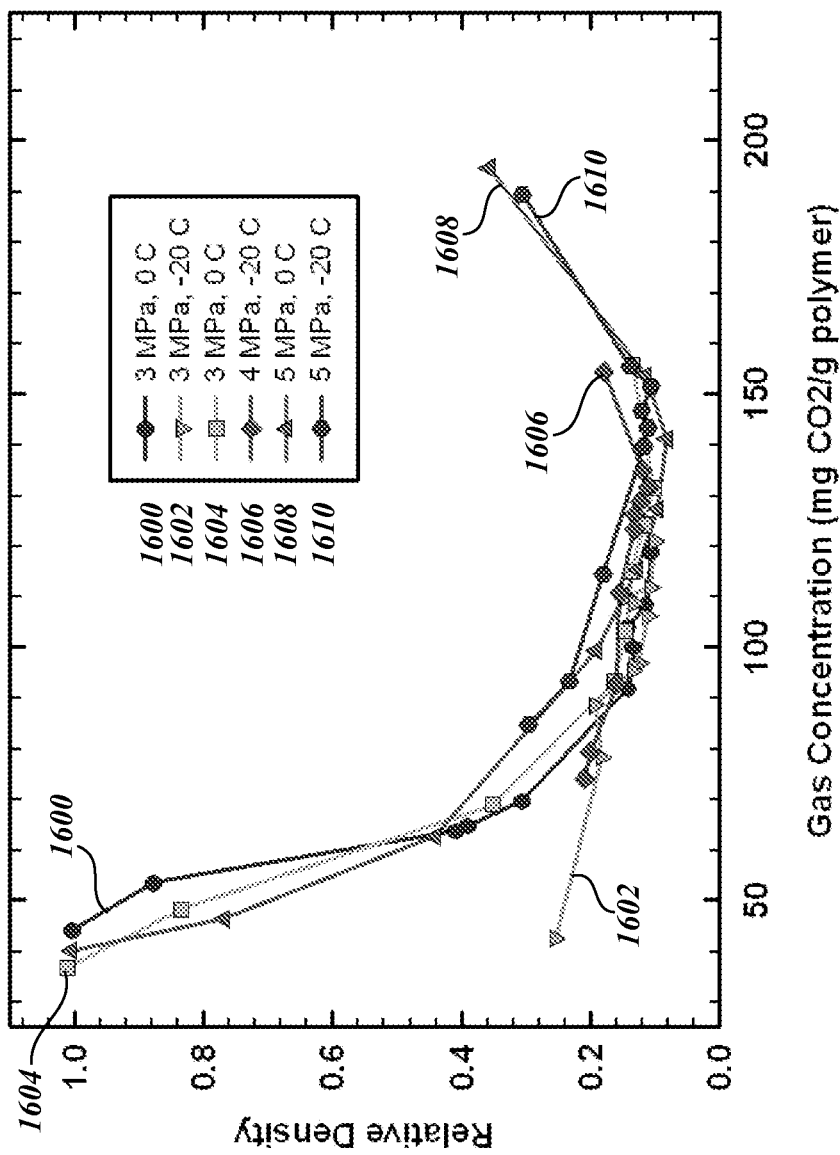
FIG. 16 is a graph of relative density versus gas concentration for samples foamed at 100° C., showing that the relative density is not dependent on saturation pressure or desorption temperature.

These initial plots lead to the conclusion that the most influential parameter on relative density is the gas concentration. Thus relative density was plotted against gas concentration for each foaming temperature (FIGS. 15 and 16). All the data (for both foaming temperatures) are plotted one on top of the other in FIG. 17. This data shows that irrespective of desorption temperature and saturation pressure, a sample with a certain gas concentration can be expected to have a certain relative density. This is very useful as it provides flexibility in process parameters to achieve a desired density goal. It should be noted, however, that this result will not necessarily hold for lower saturation pressures.

Crystallinity is rather uniform between 3 and 5 MPa, but is much lower for lower pressures (below 2.75 MPa). This would have a large effect on the bubble size, appearance, rigidity and shapeability as the crystallinity changes the way the material expands. The relative density versus gas concentration plots also indicate that the reason for the vastly different morphology of the 5 MPa samples at low desorption times may be only due to the high gas concentration in the sample. In other words, at approximately 16% by weight of $CO_2$ concentration (and higher) the expanding PLA sheet undergoes a collapse in bubble structure that results in higher relative densities. Hence, the optimal gas concentration for creating thermo formable PLA sheets is below 16% by weight of $CO_2$ gas concentration.

4. Conclusions

For a given foaming temperature, gas concentration and crystallinity prior to foaming are the main variables influencing the relative density, bubble size, rigidity, appearance and shapeability of cellular PLA.

Processing ranges for gas concentration/crystallinity at a given desorption temperature/desorption time pair have been determined in which a consistent density, bubble size, rigidity can be reached.

Lower desorption temperature significantly increases the processing window for PLA.

Thermoforming quality, solid-state, expanded, microcellular PLA can be created using $CO_2$ saturation pressures in the range of 3-5 MPa at room temperature, $CO_2$ gas concentrations between 6-16% by weight, desorption temperatures in the range of −20 C to 25 C and foaming temperatures in the range of 40-100 C.

REPRESENTATIVE THERMOFORMING EXAMPLE

1. Material

Extruded PLA sheet, thickness 0.60 mm (=0.024 inch), made by Ex-Tech Plastics was procured for this example. The resin from which the sheet was extruded is PLA 2002D (FG grade) and was made by NatureWorks™ LLC. In the as received condition, Ex-Tech reported that the material has a density of 1.24 g/cm$^3$ (=1240 kg/m$^3$=77.4 lb/ft$^3$) and a $T_g$ of 55° C. (=131 F). The PLA sheet was prepared into 10 inch×10 inch square samples. The samples were used in these experiments in the as-received condition.

2. Equipment

For the gas saturation step, a 585 mm diameter and 1.8 m deep carbon steel pressure vessel was used. The pressure vessel is rated for use up to a maximum pressure of 9 MPa at 65 C. The pressure inside the vessel was regulated using a pressure gauge with a resolution of 0.7 MPa and an accuracy of ±5% over the range. For $CO_2$ saturation study the gas supply system to the pressure vessel can deliver a maximum pressure of 5 MPa at 22 C.

For the expansion step heating of the gas saturated samples was carried out between two 760 mm square IR panels (top and bottom). The IR panels have an inner and outer heating zone. In order to keep the foaming PLA samples relatively flat the foaming in between the IR panels was conducted using a spring frame that allows the samples to expand in-plane while foaming without getting too close to either of the upper or lower IR panels. A precision balance with an accuracy of 100 μg was used to measure the density of the foamed HIPS samples.

For the thermoforming step, a Illig Prototyping Sheet Thermoformer with a 127 mm×178 mm×25 mm rectangular food packaging tray mold was used. The thermoforming machine used relay-based software control when functioning in the automatic mode. The thermoforming machine was capable of pressure and vacuum thermoforming along with a third motion plug assist that was driven independent of the machine platens by an air cylinder. The thermoforming machine had top and bottom ceramic heaters with 16 zone control. The available forming area in the thermoformer was 8 inch×8 inch. The distance between the heater surface and the sheet line in the thermoformer was 3 inch.

3. Procedure

Multiple samples of 6 inch×6 inch solid PLA were interleaved a porous material and saturated in the pressure vessel with $CO_2$ gas at room temperature at various saturation pressures of 2, 3, 4 and 5 MPa respectively. Upon saturation at a given pressure the samples were removed from the pressure vessel and foamed immediately in the IR oven by loading into the spring frame at temperatures of 40 C, 60 C, 80 C and 100 C. The target relative densities were below 40%. Each IR heater has an inner and outer heat zone. The inner zone was set to a temperature of 343 C and the outer zone (7.5 cm wide along the perimeter) was set to 399 C.

After foaming the samples were allowed to desorb gas for approximately 1 week before thermoforming such that the $CO_2$ gas concentration in the foamed material was essentially zero. For the thermoforming experiments the thermoforming machine's IR heaters were set to a temperature of 350-450 F. Each of the foamed sheets was heated for approximately 7 seconds such that the surface temperature of the material was approximately 190 F. The thermoforming mold whose temperature was controlled by heated/cooled oil circulation was set to a temperature of 106 F. The thermoforming plug whose temperature was controlled by heated/cooled water was set to a temperature of 75 F. The forming air pressure was set to 40 psi and the forming time used was 5 seconds.

4. Results and Discussion

Samples Saturated at 5 MPa

Samples saturated at 5 MPa did not show good expansion. The samples heated to 40 C did not foam at all and the rest of the foaming temperatures did not give foam that was much larger than the original virgin sheet. See FIGS. 21 through 24. Samples heated to 80 and 100 C displayed small blisters on the surface and relative density that was higher than 40%. The gas concentration in the material just prior to foaming was approximately 21% by weight and crystallinity was above 20%. The material was too brittle to load in the thermoformer and would keep cracking when loading was attempted.

Samples Saturated at 4 MPa

Samples saturated at 4 MPa showed more expansion than the 5 MPa samples, particularly for the 100 C samples. The gas concentration in the material just prior to foaming was approximately 17% by weight and crystallinity was above 20%. There was no evidence of small surface blisters. However, the foamed specimens were rather corrugated. These cellular PLA sheets could be loaded in the thermoformer but the food packaging trays had uneven appearance upon thermoforming due to the corrugations in the material prior to thermoforming. (See FIGS. 25-28.)

Samples Saturated at 3 MPa

The foamed samples saturated at 3 MPa had the best appearance compared to those saturated at 4 and 5 MPa. One of the 40 C samples was left in the oven for too long (see FIG. 29, sample 1, on the left) and it foamed. The samples foamed to 100 C expanded to about twice the original area of the sheet. The gas concentration in the material just prior to foaming was approximately 12% by weight and crystallinity was above 20%. There was minimal corrugation in the foamed samples and no surface blisters. See FIGS. 29-32. These cellular PLA sheets could be loaded in the thermoformer and the food packaging trays had a clean, even appearance. The trays were rigid with a smooth surface and a milky white finish resulting from the integral skin and microbubbles.

Samples Saturated at 2 MPa

The 2 MPa samples did not foam at 40 C and hardly foamed at 60 C. At 80 and 100 C the samples foamed and stretched a lot, but the foam samples were translucent, uneven, and had large cells similar to the samples foamed in the heated water bath. The gas concentration in the material just prior to foaming was approximately 8% by weight and crystallinity was below 20%. See FIGS. 33-37. These cellular PLA sheets could be loaded in the thermoformer. However, they were too flexible and resulted in food packaging trays that were floppy and non-rigid. The trays were incapable of holding their shape when filled with water. They would bend and buckle severely under the load. The trays had a rough surface with large bubbles in the interior that gave them a translucent look and a dull grey finish. The trays were capable of holding their shape when filled with water and there was no evidence of bending or buckling under the load.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for making a shapeable article from poly(lactic acid), comprising:
    obtaining a solid 100% by weight poly(lactic acid) having a crystallinity that is less than 20% by weight based on the weight of the solid poly(lactic acid);
    treating the solid poly(lactic acid) that results in the solid poly(lactic acid) having a crystallinity of at least 20% by weight based on the weight of the solid poly(lactic acid) and a gas concentration of 6% to 16% by weight based on the weight of the solid poly(lactic acid), wherein the poly(lactic acid) remains a solid during treating; and
    heating the solid poly(lactic acid) having said minimum crystallinity and gas concentration to produce a cellular poly(lactic acid) article that is shapeable, wherein the cellular article has cells with a size from 5 μm to 100 μm.

2. The method of claim 1, comprising treating the solid poly(lactic acid) with one or more gases at a pressure in the range of 3 MPa to 5 MPa.

3. The method of claim 1, comprising treating the solid poly(lactic acid) with one or more gases at a pressure in the range of 2.75 MPa to 7 MPa.

4. The method of claim 3, wherein the one or more gases comprise carbon dioxide.

5. The method of claim 1, comprising treating the solid poly(lactic acid) with one or more gases at a pressure in the range of 3 MPa to 5 MPa to allow the one or more gases to be absorbed followed by treating the solid poly(lactic acid) at atmospheric pressure at a temperature in the range of −20° C. to 25° C. to allow the one or more gases to desorb from the solid poly(lactic acid).

6. The method of claim 1, comprising heating the solid poly(lactic acid) having said minimum crystallinity and said range of gas concentration at a temperature in the range of 40° C. to 100° C. to produce the cellular poly(lactic acid) that is shapeable.

7. The method of claim 1, wherein treating comprises a period of gas saturation followed by a period of gas desorption to provide a minimum crystallinity of 20% by weight and the gas concentration of 6% to 16% by weight.

8. The method of claim 7, wherein the solid poly(lactic acid) is completely saturated before the period of gas desorption.

9. The method of claim 1, wherein treating comprises a period of partial gas saturation to provide a minimum crystallinity of 20% by weight and the gas concentration of 6% to 16% by weight.

10. The method of claim 1, wherein the cellular poly(lactic acid) article has a density that is less than or equal to 40% of the density of the solid poly(lactic acid).

11. The method of claim 1, wherein the cellular poly(lactic acid) article has a cellular poly(lactic acid) structure within the interior and an integral noncellular poly(lactic acid) layer at the surface.

12. A method for making a shaped product from solid poly(lactic acid), comprising:

treating solid 100% by weight poly(lactic acid) that results in the solid poly(lactic acid) having a minimum crystallinity of 20% by weight based on the weight of the solid poly(lactic acid) and a gas concentration of 6% to 16% by weight based on the weight of the solid poly(lactic acid)), wherein the poly(lactic acid) remains a solid during treating;

heating the solid poly(lactic acid) having said minimum crystallinity and said range of gas concentration to produce a cellular poly(lactic acid) article that is shapeable, wherein the cellular article has cells with a size from 5 µm to 100 µm; and shaping the cellular poly(lactic acid) into a product.

13. The method of claim 12, wherein the cellular poly(lactic acid) article comprises a gas concentration of essentially 0% by weight before shaping.

14. The method of claim 12, wherein shaping comprises applying heat and at least one of pressure or vacuum to the cellular poly(lactic acid).

15. The method of claim 12, wherein shaping comprises molding the cellular poly(lactic acid) to the shape of a mold.

16. The method of claim 12, wherein the solid poly(lactic acid) is a rod or sheet.

* * * * *